United States Patent
Motoyoshi

(10) Patent No.: US 8,290,072 B2
(45) Date of Patent: Oct. 16, 2012

(54) TRANSMISSION APPARATUS, RECEPTION APPARATUS, COMMUNICATION APPARATUS, AND COMMUNICATION SYSTEM

(75) Inventor: Katsuyuki Motoyoshi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 483 days.

(21) Appl. No.: 12/446,771

(22) PCT Filed: Oct. 24, 2007

(86) PCT No.: PCT/JP2007/070697
§ 371 (c)(1),
(2), (4) Date: Apr. 23, 2009

(87) PCT Pub. No.: WO2008/050788
PCT Pub. Date: May 2, 2008

(65) Prior Publication Data
US 2010/0014604 A1    Jan. 21, 2010

(30) Foreign Application Priority Data
Oct. 24, 2006  (JP) .................................. 2006-288997

(51) Int. Cl.
*H04K 1/10* (2006.01)
*H04L 27/28* (2006.01)
(52) U.S. Cl. ....................................... 375/260; 375/267
(58) Field of Classification Search .................. 375/260, 375/267
See application file for complete search history.

(56) References Cited

U.S. PATENT DOCUMENTS

| | | | | |
|---|---|---|---|---|
| 6,108,374 A | * | 8/2000 | Balachandran et al. | 375/227 |
| 6,389,066 B1 | * | 5/2002 | Ejzak | 375/224 |
| 7,136,624 B2 | * | 11/2006 | Ofuji et al. | 455/63.4 |
| 2003/0181163 A1 | | 9/2003 | Ofuji et al. | |
| 2006/0153062 A1 | | 7/2006 | Tanabe et al. | |

FOREIGN PATENT DOCUMENTS

| | | |
|---|---|---|
| CN | 1437420 A | 8/2003 |
| CN | 1832390 A | 9/2006 |
| CN | 1848832 A | 10/2006 |
| JP | 2003 87191 | 3/2003 |
| JP | 2003 235072 | 8/2003 |
| JP | 2004 179821 | 6/2004 |

(Continued)

OTHER PUBLICATIONS

Office Action issued Dec. 6, 2011, in Japanese Patent Application No. 2008-541003 (with English-language Translation).

(Continued)

*Primary Examiner* — Shuwang Liu
*Assistant Examiner* — Nader Bolourchi
(74) *Attorney, Agent, or Firm* — Oblon, Spivak, McClelland, Maier & Neustadt, L.L.P.

(57) ABSTRACT

A transmission apparatus divides transmission data according to spatial streams and transmits divided transmission data in parallel in an MIMO communication system. A control unit selects a modulation scheme for each of the spatial streams and determines a data allocation method for each of the spatial streams based on a selected modulation scheme. An allocating unit allocates the transmission data to each of the spatial streams based on the data allocation method determined by the control unit. A modulating unit modulates allocation data for each of the spatial streams by using the selected modulation scheme for each of the spatial streams.

12 Claims, 16 Drawing Sheets

FOREIGN PATENT DOCUMENTS

| | | |
|---|---|---|
| JP | 2004 304760 | 10/2004 |
| JP | 2004 320434 | 11/2004 |
| JP | 2004 535106 | 11/2004 |
| JP | 2005 86781 | 3/2005 |
| JP | 2005 509316 | 4/2005 |
| JP | 2005 318117 | 11/2005 |
| JP | 2006 14066 | 1/2006 |
| JP | 2006 503446 | 1/2006 |
| JP | 2006 60383 | 3/2006 |
| JP | 2006 67572 | 3/2006 |
| JP | 2006 211649 | 8/2006 |
| JP | 2006 217239 | 8/2006 |
| JP | 2006 520109 | 8/2006 |
| JP | 2006 521068 | 9/2006 |
| JP | 2006 333283 | 12/2006 |
| JP | 2007 28569 | 2/2007 |
| JP | 2007 502072 | 2/2007 |
| JP | 2007 135211 | 5/2007 |
| JP | 2007 214992 | 8/2007 |
| JP | 2007 221755 | 8/2007 |
| WO | WO 2006/064857 | 6/2006 |
| WO | 2006 093093 | 9/2006 |
| WO | 2006 095741 | 9/2006 |

OTHER PUBLICATIONS

Uchida, D. et al., "A Proposal of Inter-Eigenbeam Interleaving Scheme in Eigenbeam-Space Division Multiplexing for OFDM System" Proceedings of the IEICE General Conference, p. 474, B-5-25, (2005).

Chinese Office Action—date mailed Feb. 2, 2012.

* cited by examiner

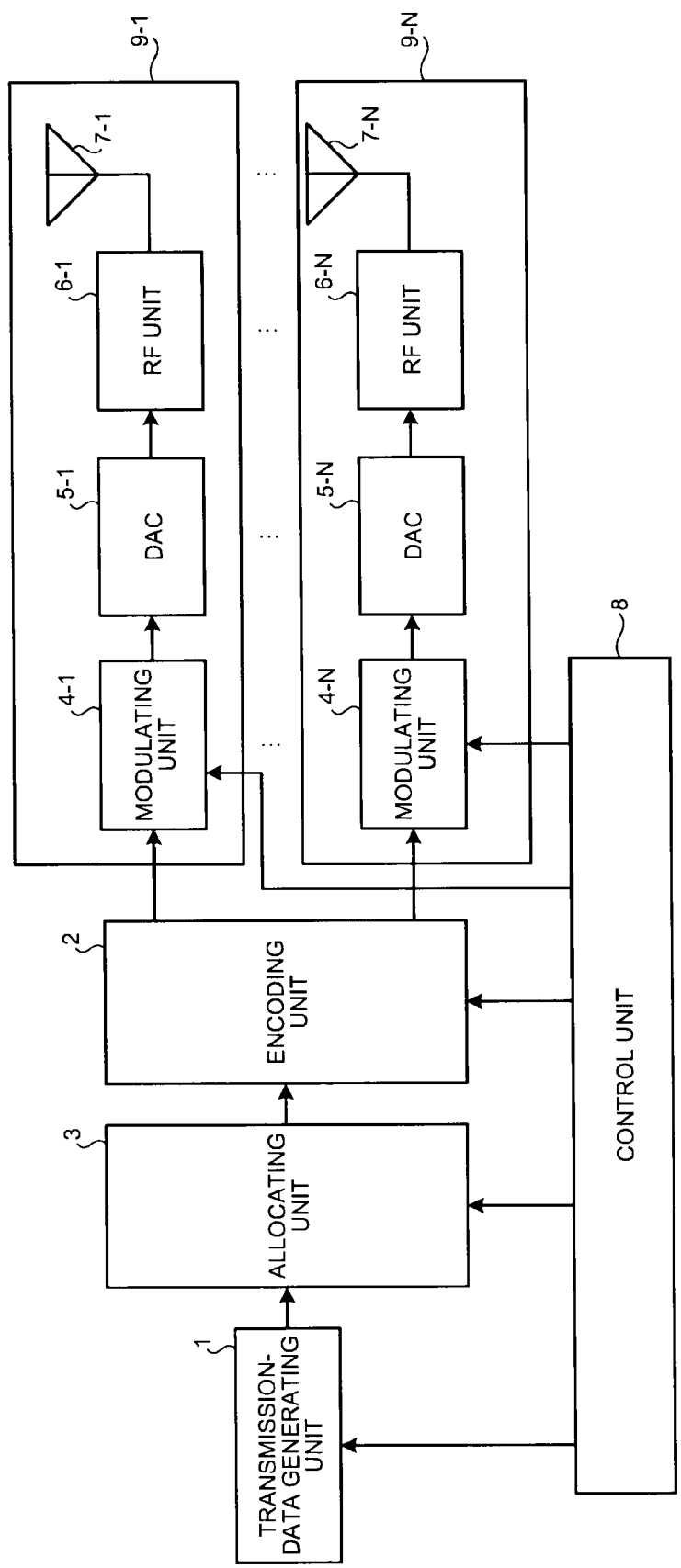

US 8,290,072 B2

TRANSMISSION APPARATUS, RECEPTION APPARATUS, COMMUNICATION APPARATUS, AND COMMUNICATION SYSTEM

CROSS REFERENCE TO RELATED APPLICATIONS

This application is a national phase application based on International Application No. PCT-JP2007-070697, filed Oct. 24, 2007, which claims the priority of Japanese Patent Application No. 2006-288997 filed on Oct. 24, 2006, the content of both of which is incorporated herein by reference.

TECHNICAL FIELD

The present invention relates to a transmission apparatus in a wireless communication system, and more particularly to a transmission apparatus, a reception apparatus, a communication apparatus, and a communication system with multiple-input multiple-output (MIMO) multiplexing.

BACKGROUND ART

In MIMO multiplexing, transmitting signals are assigned to a plurality of spatial streams; however, when the transmitting signals are assigned to the spatial streams in a fixed manner, variation in transmission quality can develop among the transmitting signals. To this end, conventionally association between transmitting signals and spatial streams has been periodically changed to equalize the transmitting signals in terms of transmission quality so that data transmission is less affected by channel estimation error resulting from variations in communication channels. For example, the following Nonpatent Document 1 describes a method of performing inter-eigenbeam interleaving for equalization of SINRs (Signal-to-Interference noise power Ratios) in an E-SDM (Eigenbeam-Space Division Multiplexing) system. In this system, MIMO spatial streams are assumed to be eigenbeams and inter-eigenbeam interleaving is performed by applying a single transmission power and a single modulation method to each of the eigenbeams.

Generally, when data is to be transmitted via transmitting antennas that differ from one another in quality of received signals transmitted via the transmitting antennas (e.g., SINRs), spectral efficiency can be increased by controlling any one of a transmission rate (by controlling a modulation order or an error-correction encoding rate) and transmission power for each of the transmitting signals depending on the quality.

Nonpatent Document 1: Uchida Daisei, Ohta Atsushi, Fujita Takashi, Asai Yusuke, Kagami Osamu, and Umehira Masahiro, "A Proposal of Inter-Eigenbeam Interleaving Scheme for Eigenbeam-Space Division Multiplexing for OFDM System", Proceedings of the IEICE General Conference 2005, B-5-25.

DISCLOSURE OF INVENTION

Problem to be Solved by the Invention

However, the conventional interleaving of spatial streams in MIMO multiplexing undesirably equalizes quality of received signal of transmission data. Accordingly, in contrast to the above, it is unattainable to control a transmission rate or transmission power depending on transmission quality of each of the spatial stream. This makes it impossible to assign larger amount of transmission data to high-quality spatial streams, preventing more efficient use of limited frequency bands, which has been a problem.

The prevent invention has been made in view of the above circumstance and it is an object of the present invention to provide a transmission apparatus, a reception apparatus, a communication apparatus, and a communication system capable of attaining, in MIMO multiplexing, high transmission quality by interleaving of spatial streams as well as improving spectral efficiency and transmission rate as compared with those attained by conventional interleaving of spatial streams.

Means for Solving Problem

To solve the above problems and to achieve the object, a transmission apparatus according to the present invention divides transmission data according to spatial streams and transmits divided transmission data in parallel in an MIMO communication system. The transmission apparatus includes a control unit that selects a modulation scheme for each of the spatial streams and determines a data allocation method for each of the spatial streams based on the modulation scheme; an allocating unit that allocates the transmission data to each of the spatial streams based on the data allocation method determined by the control unit; and a modulating unit that modulates allocation data for each of the spatial stream, which is an output from the allocating unit, s by using the modulation scheme selected by the control unit for each of the spatial streams.

Effect of the Invention

According to the present invention, a signal mapping scheme is selected for each of transmission branches, each of which corresponds to one of spatial streams, based on reception signal quality information of the transmission branches so that transmission branches 9-1 to 9-N have different transmission rates. Accordingly, transmission quality, spectral efficiency, and transmission rate can be improved as compared with those of conventional interleaving of spatial streams.

BRIEF DESCRIPTION OF DRAWINGS

FIG. 1-1 is a functional configuration example according to a first embodiment.

[FIG. 1-2] FIG. 1-2 is another functional configuration example according to the first embodiment.

[FIG. 2] FIG. 2 is a flowchart depicting system control according to the first embodiment.

FIG. 3 is a diagram depicting an example of an allocation method according to the first embodiment.

FIG. 4 is a diagram depicting an example of the allocation method according to the first embodiment.

FIG. 5 is a functional configuration example according to a second embodiment.

FIG. 6 is a diagram depicting an example of an allocation method according to the second embodiment.

FIG. 7 is a flowchart depicting system control according to the second embodiment.

FIG. 8 is a functional configuration example according to a third embodiment.

FIG. 9 is a functional configuration example according to a fourth embodiment.

FIG. 10 is a functional configuration example, to which rate matchings are added, according to the third embodiment.

FIG. 11 is a functional configuration example according to a fifth embodiment.

FIG. 12 is a functional configuration example according to a sixth embodiment.

FIG. 13 is a functional configuration example according to a seventh embodiment.

FIG. 14 is a functional configuration example according to an eighth embodiment.

FIG. 15 is a functional configuration example according to a ninth embodiment.

Figure 1:
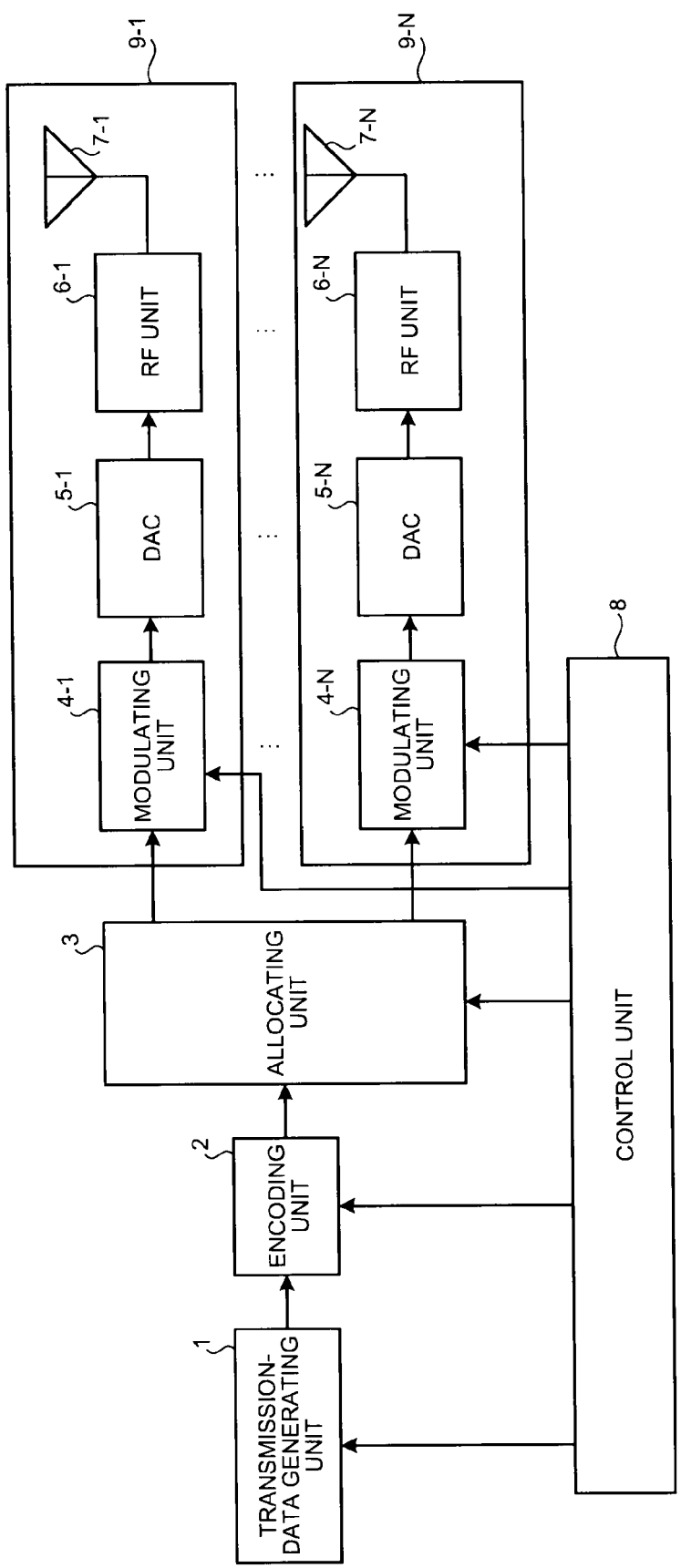
[FIG. 1]

EXPLANATIONS OF LETTERS OR NUMERALS 1 transmission-data generating unit
2 encoding unit
3 allocating unit
4-1 to 4-N modulating units
5-1 to 5-N DACs
6-1 to 6-N RF units
7-1 to 7-N transmitting antennas
8, 8a, 8b, 8c, 8d, 8e, 8f, 8g, 8h control units
9-1 to 9-N transmission branches
10-1, 10-2, 13-1, 13-2, 16-1, 16-2 transmission data blocks
11-1 to 11-3, 12-1 to 12-3, 13-1 to 13-3, 15-1 to 15-3, 17-1 to 17-3, 18-1 to 18-3 allocation data
21-1 to 21-N interleavers
22-1 to 22-N, 24 rate matchings
31-1 to 31-M receiving antennas
32-1 to 32-M RF units
33-1 to 33-M ADCs
34, 34a, 34b signal separating units
35 combining unit
36 decoding unit
37, 37a weight multiplying unit
38-1 to 38-N OFDM modulating units
39-1 to 39-M OFDM demodulating units
40 MIMO channels
100-1, 100-2, 100a-1, 100a-2, 100b-1, 100b-2 communication apparatuses

BEST MODE(S) FOR CARRYING OUT THE INVENTION

A transmission apparatus, a reception apparatus, a communication apparatus, and a communication system according to exemplary embodiments of the present invention are described in detail below with reference to the accompanying drawings. The present invention is not limited to these exemplary embodiments.

First Embodiment

Figure 2:
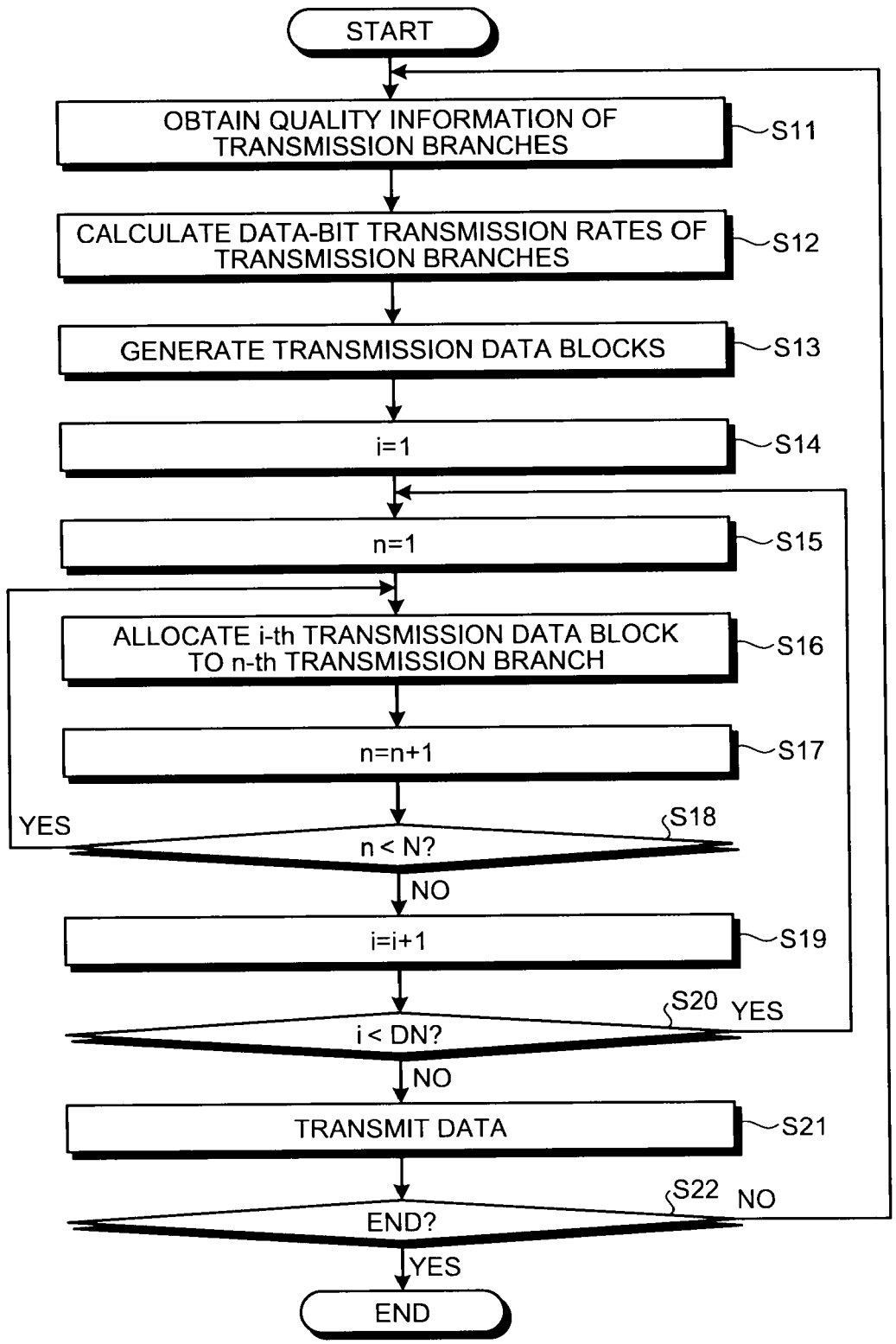

FIG. 1-1 is a functional configuration example of a transmission apparatus according to a first embodiment of the present invention. FIG. 1-2 is another functional configuration example of the transmission apparatus according to the first embodiment of the present invention. As shown in FIG. 1-1 and FIG. 1-2, the transmission apparatus according to the present embodiment includes a transmission-data generating unit 1, an encoding unit 2, an allocating unit 3, modulating units 4-1 to 4-N (N: the number of transmitting antennas), DACs (Digital Analog Converters) 5-1 to 5-N, RF units 6-1 to 6-N, the transmitting antennas 7-1 to 7-N, and a control unit 8. Each of transmission branches 9-1 to 9-N includes one of the modulating units 4, one of the DACs 5, one of the RF units 6, and one of the transmitting antennas 7, the ones having the same subnumber as that of the transmission branch. In the present embodiment, one transmission branch is associated with one spatial stream. The first embodiment will be described below with reference to the functional configuration example shown in FIG. 1-1.

Functions of various units will be described below. The transmission-data generating unit 1 generates a transmission data block which is data to be transmitted, and outputs it to the encoding unit 2. The encoding unit 2 performs error correction encoding of the transmission data block output from the transmission-data generating unit 1, and outputs the transmission data block to the allocating unit 3. Examples of the error correction encoding include convolutional coding, turbo coding, low-density parity-check (LDPC) coding, and addition of cyclic redundancy check (CRC) bits. The allocating unit 3 assigns the transmission data block output from the encoding unit 2 to each of the transmission branches 9-1 to 9-N. The allocating unit 3 distributes the data that is assigned to one of the transmission branches 9-1 to 9-N to one of the modulating units 4-1 to 4-N that belongs to the one of the transmission branches 9-1 to 9-N as allocation data.

The modulating units 4-1 to 4-N perform signal processing, such as symbol mapping, of the allocation data, and output the signal-processed transmission data as digital signals to corresponding ones of the DACs 5-1 to 5-N. The DACs 5-1 to 5-N perform digital-to-analog conversion of the digital signals output from the modulating units 4-1 to 4-N, and output the converted analog signals to corresponding ones of the RF units 6-1 to 6-N. The RF units 6-1 to 6-N perform predetermined analog signal processing such as frequency conversion, amplification, and filtering of the signals output from the DACs 5-1 to 5-N, and output the processed signals to corresponding ones of the transmitting antennas 7-1 to 7-N. The transmitting antennas 7-1 to 7-N transmit the signals output from the RF units 6-1 to 6-N in parallel as radio waves.

The control unit 8 performs control operations necessary for a reception apparatus. For example, the control unit 8 obtains information about reception signal quality, and provides specification about sizes of transmission data blocks to the transmission-data generating unit 1, specification about error correction encoding schemes and encoding rates to the encoding unit 2, specification about an allocation method to the allocating unit 3, and specification about symbol mapping schemes to the modulating units 4-1 to 4-N.

The system control according to the present embodiment will be described below. FIG. 2 is a flowchart depicting the system control according to the present embodiment. First, the control unit 8 obtains reception signal quality information of the transmission branches 9-1 to 9-N (Step S11). As a method for obtaining the reception signal quality information of the transmission branches 9-1 to 9-N, for example, indices that indicate reception signal quality of the transmission branches 9-1 to 9-N can be obtained from a reception side through a from-reception-side-to-transmission-side channel. Examples of the index include an SINR or a CQI (Channel Quality Index), which is an indexed value of SINR. In TDD (Time Division Duplex) communications, an index that indicates quality can be obtained from a channel estimated value or the like that is obtained when a signal is received through the from-reception-side-to-transmission-side channel. Alternatively, reception signal quality information of the from-reception-side-to-transmission-side channel can be used. The index is not limited to these examples, and any other index that indicates reception signal quality information of the transmission branches 9-1 to 9-N can be used.

The control unit 8 selects a symbol mapping scheme of each of the transmission branches 9-1 to 9-N based on the reception signal quality information of the transmission branches 9-1 to 9-N obtained at Step S11. The control unit 8 calculates data-bit transmission rates and specifies an allocation method (Step S12). The modulating units 4-1 to 4-N perform signal processing based on the selected symbol mapping schemes as a part of the procedure to be performed at Step S20, which will be described later. The symbol mapping schemes can be assigned, for example, such that a symbol mapping scheme with a high-order of modulation (symbol mapping scheme with a high transmission rate) is assigned to a transmission branch having high reception signal quality, whereas a symbol mapping scheme with a low-order of modulation (symbol mapping scheme with a low transmission rate) is assigned to a transmission branch having low reception signal quality.

For example, when N=2 and reception signal quality of the transmission branch 9-1 is higher than that of the transmission branch 9-2, 16-QAM mapping, which is high-order modulation, is assigned to the transmitting branch 9-1 and QPSK mapping to the transmitting branch 9-2. When there is little difference in reception signal quality between the transmission branches, a same symbol mapping scheme is assigned to the transmission branches 9-1 and 9-2.

In the present embodiment, because rate adjustment such as rate matching is not performed, transmission data-bit rate is proportional to an order of modulation. Accordingly, R', which is a transmission rate of data bits, can be obtained from: R'=A×R where A is an order of modulation and R is a transmission data-bit rate in a state in which the order of modulation is 1. R is to be set in advance according to transmission condition and the like.

With the allocation method according to the present embodiment, each of the transmission data blocks is allocated to the transmission branches 9-1 to 9-N according to a ratio among transmission data-bit rates of the transmission branches 9-1 to 9-N. When symbol mapping schemes are selected, whereby a ratio among transmission data-bit rates is determined, and hence an allocation ratio is determined. The allocating unit 3 receives specification about the allocation ratio.

The transmission-data generating unit 1 generates information-transmission data blocks based specification, provided from the control unit 8, about sizes of transmission data blocks. The encoding unit 2 performs error correction encoding of the information-transmission data blocks to generate transmission data blocks (Step S13). The size and the number of the transmission data blocks are not specifically limited. The control unit 8 can determine the size and the number according to N, which is the number of the transmission data blocks, an amount of data to be transmitted, and the like. Hereinafter, the number of transmission data blocks to be transmitted is referred to as DN.

The allocating unit 3 sets i (a sequential number indicating the order of generation of a transmission block) to 1 (Step S14), and sets n (a subnumber of a transmission branch) to 1 (Step S15).

The allocating unit 3 allocates an i-th transmission data block generated at Step S12 pertaining to the specified allocation method to the transmission branches 9-1 to 9-N, and distributes divided data that is allocated to the transmission data block 9-n to the modulating unit 4-n (Step S16).

The allocating unit 3 increments n by one (Step S17). When n is determined to be smaller than N, the system control returns to Step S16 (Yes at Step S18), and the system control from Steps S16 to S18 is repeated. When n is determined to be equal to N (No at Step S18), the allocating unit 3 increments i by one (Step S19). When i is determined to be smaller than DN, the system control returns to Step S15 (Yes at Step S20), and the system control from Steps S15 to S20 is repeated. When i is determined to be equal to DN (No at Step S20), the system control proceeds to Step S21.

For example, when i is determined to be equal to DN, the modulating units 4-1 to 4-N perform signal processing of allocation data output from the allocating unit 3 according to the signal mapping schemes selected at Step S12. The DACs 5-1 to 5-N convert the signals into analog signals. The RF units 6-1 to 6-N perform analog signal processing of the analog signals. The transmitting antennas 7-1 to 7-N transmit the analog-signal-processed signals as radio waves (Step S21).

When the procedure at Step S21 ends, the control unit 8 determines whether all data to be transmitted has been transmitted. When it is determined that all data has been transmitted (Yes at Step S22), the control unit 8 issues an instruction to bring the system control to end. When it is determined that not-yet-transmitted data remains (No at Step S22), the procedure from Step S11 to Step S21 is repeated.

Figure 3:
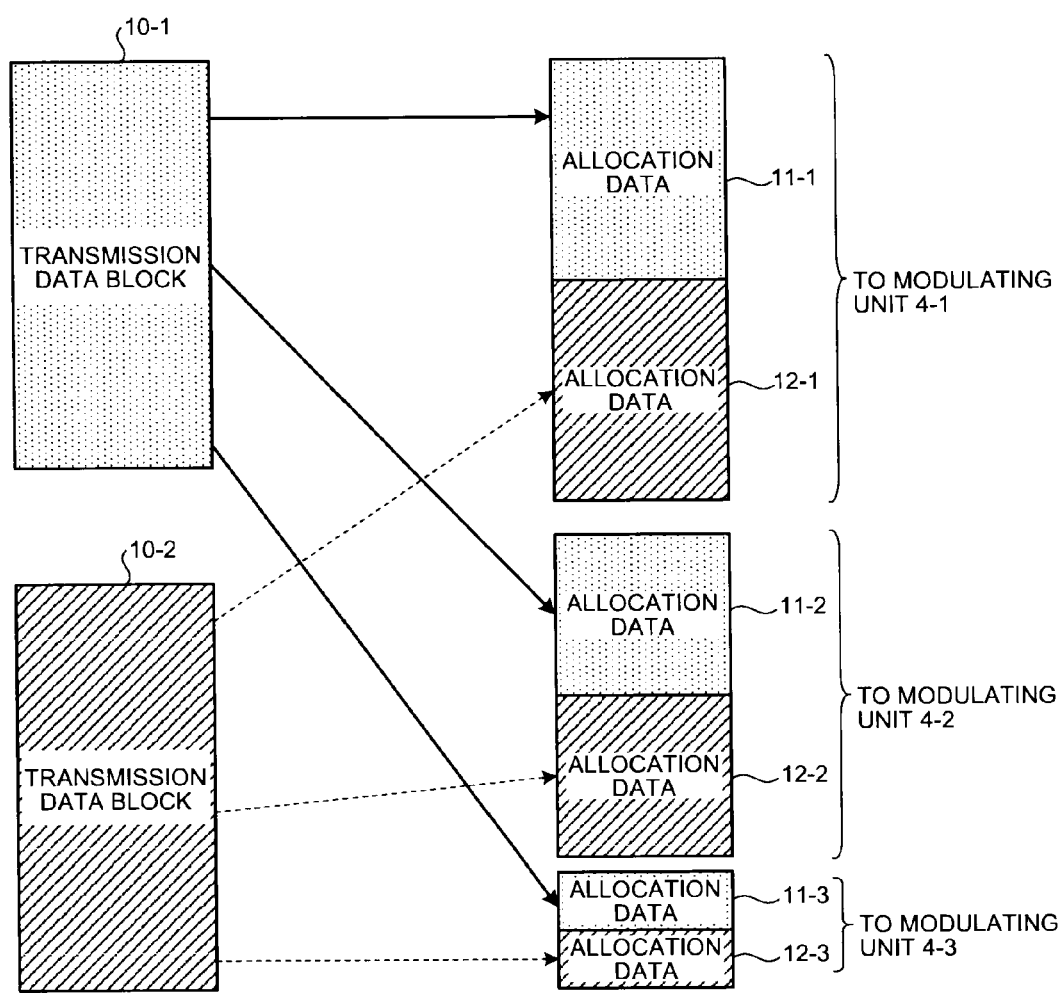
[FIG. 3]

The allocation method according to the present embodiment will be described in detail by way of an example. FIG. 3 is a diagram depicting an example of the method for allocation of transmission data blocks to be performed by the allocating unit 3. FIG. 3 depicts the example with N=3 and DN=2. Transmission data blocks 10-1 and 10-2 in FIG. 3 are transmission data blocks having undergone error correction encoding performed by the encoding unit 2. The transmission data blocks 10-1 and 10-2 are equal to each other in data size. The transmission data block 10-1 is divided into allocation data 11-1, 11-2, and 11-3 and allocated to the transmission branches 9-1, 9-2, and 9-3, respectively. The transmission data block 10-2 is divided into allocation data 12-1, 12-2, and 12-3 and allocated to the transmission branches 9-1, 9-2, and 9-3, respectively.

The allocating unit 3 allocates the transmission data blocks 10-1 and 10-2 to the modulating units 4-1 to 4-3 according to the transmission data-bit rates of the transmission branches 9-1 to 9-3. As described above, a transmission data-bit rate is proportional to an order of modulation in the present embodiment. Hence, in the following description, a ratio among values of modulation orders will be used in place of the ratio among transmission data-bit rates.

Figure 12:
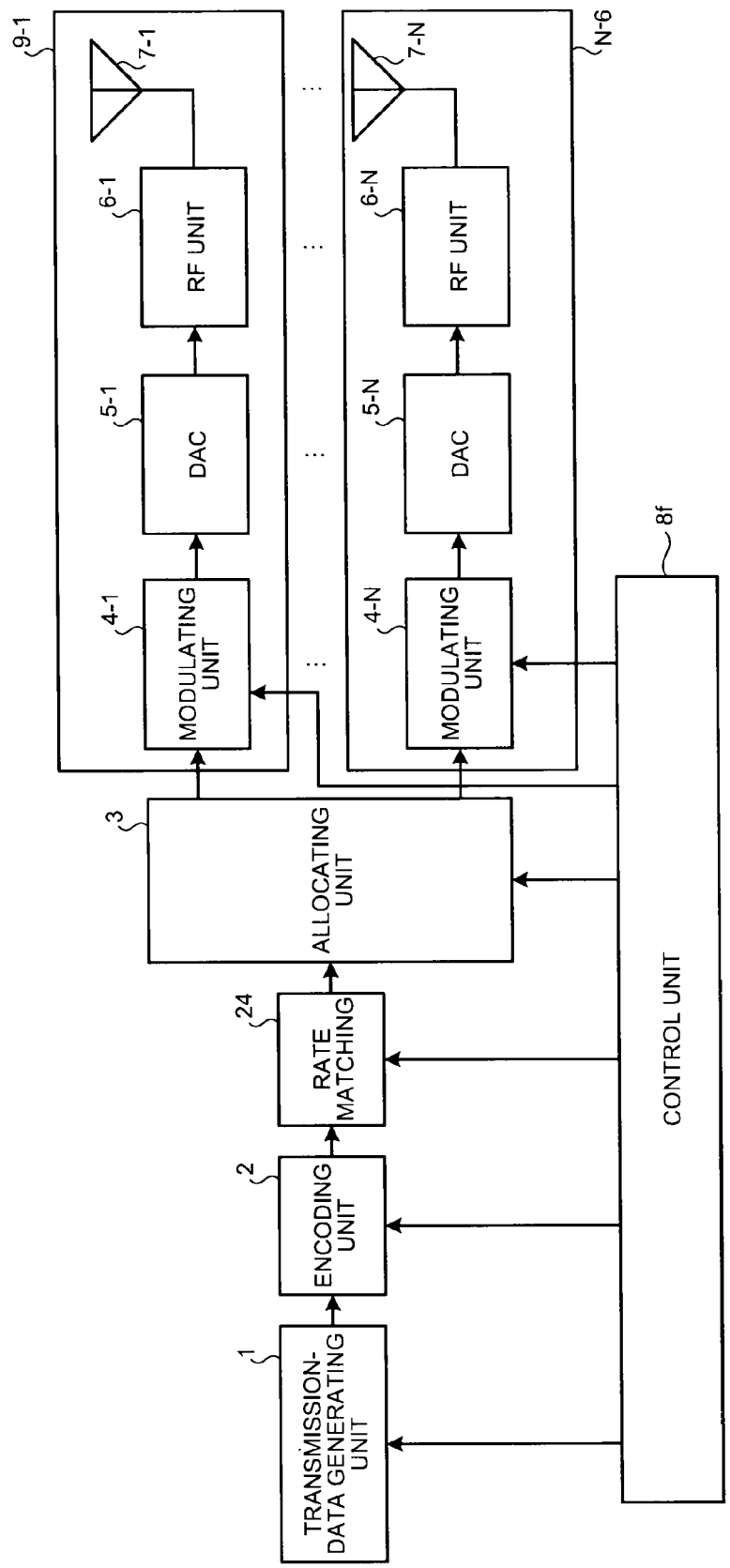
[FIG. 12]

For example, assume that 64-QAM (Quadrature Amplitude Modulation), 16-QAM, and QPSK are selected as symbol mapping schemes for the transmission branches 9-1, 9-2, and 9-3, respectively, at Step S12 of FIG. 12. In this case, each of the transmission data blocks 10-1 and 10-2 is allocated according to 6:4:2 (64-QAM:16-QAM:QPSK), which is a ratio among values of modulation orders of the symbol mapping schemes.

More specifically, first, the allocating unit 3 divides the transmission data block 10-1 into the allocation data 11-1, the allocation data 11-2, and the allocation data 11-3 such that a ratio among data amounts of them is 6:4:2. The allocating unit 3 allocates the allocation data 11-1 to the modulating unit 4-1, the allocation data 11-2 to the modulating unit 4-2, and the allocation data 11-3 to the modulating unit 4-3.

Similarly, the allocating unit 3 divides the transmission data block 10-2 into the allocation data 12-1, the allocation data 12-2, and the allocation data 12-3 such that the ratio among data amounts of them is 6:4:2, and allocates the allocation data 12-1, the allocation data 12-2, and the allocation data 12-3 to the modulating unit 4-1, the modulating unit 4-2, and the modulating unit 4-3, respectively.

Figure 4:
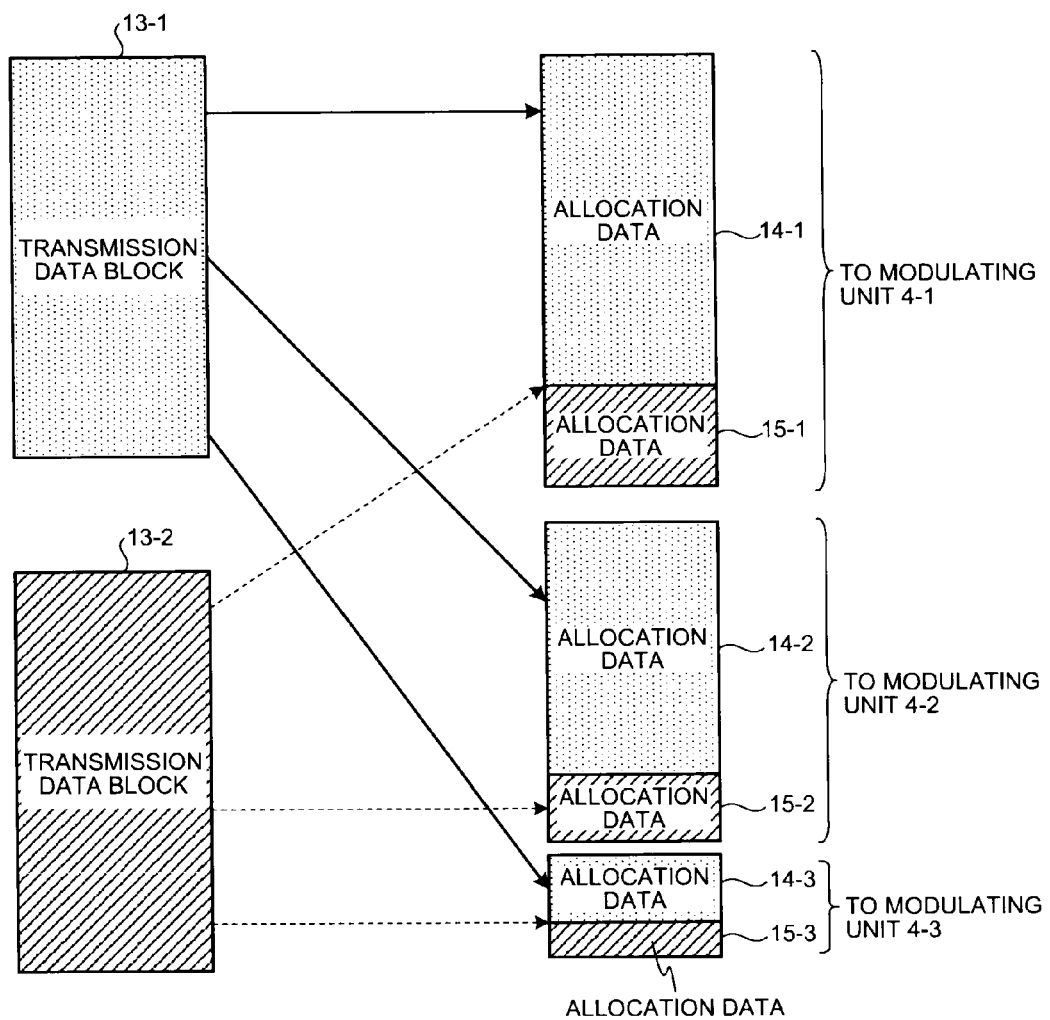
[FIG. 4]

FIG. 4 is a diagram depicting another example of the method, to be performed by the allocating unit 3, of transmission data blocks having undergone error correction encoding. FIG. 4 depicts the example with N=3 and DN=2. Transmission data blocks 13-1 and 13-2 in FIG. 4 are transmission data blocks having undergone error correction encoding performed by the encoding unit 2. The transmission data block 13-1 is divided into allocation data 14-1, 14-2, and 14-3 and allocated to the transmission branches 9-1, 9-2, and 9-3, respectively. The transmission data block 13-2 is divided into allocation data 15-1, 15-2, and 15-3 and allocated to the transmission branches 9-1, 9-2, and 9-3, respectively. The example shown in FIG. 4 differs from the example shown in FIG. 3 in that the transmission data blocks 13-1 and 13-2 have different sizes.

FIG. 4 depicts an example in which transmission data blocks have different sizes as do the transmission data blocks 13-1 and 13-2. Such a circumstance generally occurs in HARQ (hybrid ARQ (Automatic Repeat Request)). For example, in an "Incremental Redundancy (IR)-based HARQ", a self-decodable data packet is transmitted for first transmission, and redundancy bits are added to retransmission data at retransmission in some cases. In this case, encoding rates at retransmissions are lower than that at the first transmission, causing an amount of data of a transmission data block having undergone error correction encoding to differ from that of the first transmission.

To this end, in the present embodiment, even when the transmission data blocks 13-1 and 13-2 have different sizes, as shown in FIG. 4, each of the transmission data blocks 13-1 and 13-2 is divided and allocated according to the ratio among the transmission data-bit rates (equal to the ratio among the values of modulation orders in the present embodiment) of the transmission branches 9-1 to 9-3 as with the example of FIG. 3.

FIG. 3 and FIG. 4 depict examples with DN=2 and N=3; however, DN and N are not limited thereto. A requisite condition is that the transmission data block is divided and allocated depending on the numbers of DN and N according to a ratio among transmission data-bit rates of the transmission branches as described above.

The functional configuration example of FIG. 1-2 will be described below. In the configuration of FIG. 1-2, the allocating unit 3 and the encoding unit 2 are arranged in reverse order of that of FIG. 1-1. Accordingly, transmission data is allocated by the allocating unit 3 and thereafter subjected to error correction encoding performed by the encoding unit 2. The system control with the functional configuration example of FIG. 1-2 is similar to processing of FIG. 2, which is the system control with the functional configuration example of FIG. 1-1; however, differs from the same in Step S12, Step S13, Step S16, and Step S21, which will be described below.

With the configuration of FIG. 1-2, at Step S12, allocation is not performed according to a ratio among data-bit transmission rates. Instead, an error-correction encoding rate is set for each of the transmission branches, and an allocation ratio is determined by using transmission rates (hereinafter, "encoded-bit transmission rates"). The transmission rates are determined by taking both data-bit transmission rates and the error-correction encoding rates into account. First, the error-correction encoding rates and encoding schemes of the transmission branches 9-1 to 9-N are set by using the reception signal quality information of the transmission branches 9-1 to 9-N. The encoding rates are set such that the higher the reception signal quality, the higher the encoding ratio is. No specific limitation is imposed on the encoding rate and the encoding scheme, and a general method for determining an error-correction encoding rate based on reception signal quality information can be employed. A symbol mapping scheme is selected as with the configuration example of FIG. 1-1 to calculate a data-bit transmission rate. Thereafter, the data-bit transmission rate is multiplied by the inverse of the error-correction encoding rate to obtain the encoded-bit transmission rate. The allocation ratio is determined based on the encoded-bit transmission rate in place of the data-bit transmission rate. The allocation ratio is fed to the allocating unit 3 as specification. The error-correction encoding rate and the encoding scheme are fed to the encoding unit 2 as specification.

At Step S13, the transmission-data generating unit 1 generates an information-transmission data block and outputs the information-transmission data block to the allocating unit 3 as a transmission data block rather than to the encoding unit 2.

At Step S16, the allocating unit 3 allocates, in place of the transmission data block output from the encoding unit 2, the transmission data block output from the transmission-data generating unit 1. The encoding unit 2 performs error correction encoding of the allocation data based on the specification received from the control unit 8 about the error-correction encoding rate and the encoding scheme for each of the transmission branches 9-1 to 9-N. The data having undergone error correction encoding is output to the modulating unit 4-n as allocation data. At Step S21, the modulating unit 4-n performs signal processing of the allocation data output from the encoding unit 2 in place of allocation data output from the allocating unit 3.

The transmission apparatus according to the embodiment of the present invention is also applicable to OFDM (Orthogonal Frequency Division Multiplexing) transmission and to OFDMA (Orthogonal Frequency Division Multiple Access) transmission. In this case, the control unit 8 selects a method of allocating a transmission data block to each of subcarriers or to each of subcarrier groups each of which includes a plurality of subcarriers, and the allocating unit 3 allocates the transmission data block to the transmission branches 9-1 to 9-N according to the method.

As described above, in the present embodiment, a signal mapping scheme is selected for each of the transmission branches 9-1 to 9-N based on reception signal quality information of the transmission branches 9-1 to 9-N so that the transmission branches 9-1 to 9-N can have different data-bit transmission rates. Accordingly, high transmission quality can be attained by interleaving of spatial streams, and simultaneously spectral efficiency higher than that attained by conventional interleaving of spatial streams can be attained.

Second Embodiment

Figure 5:
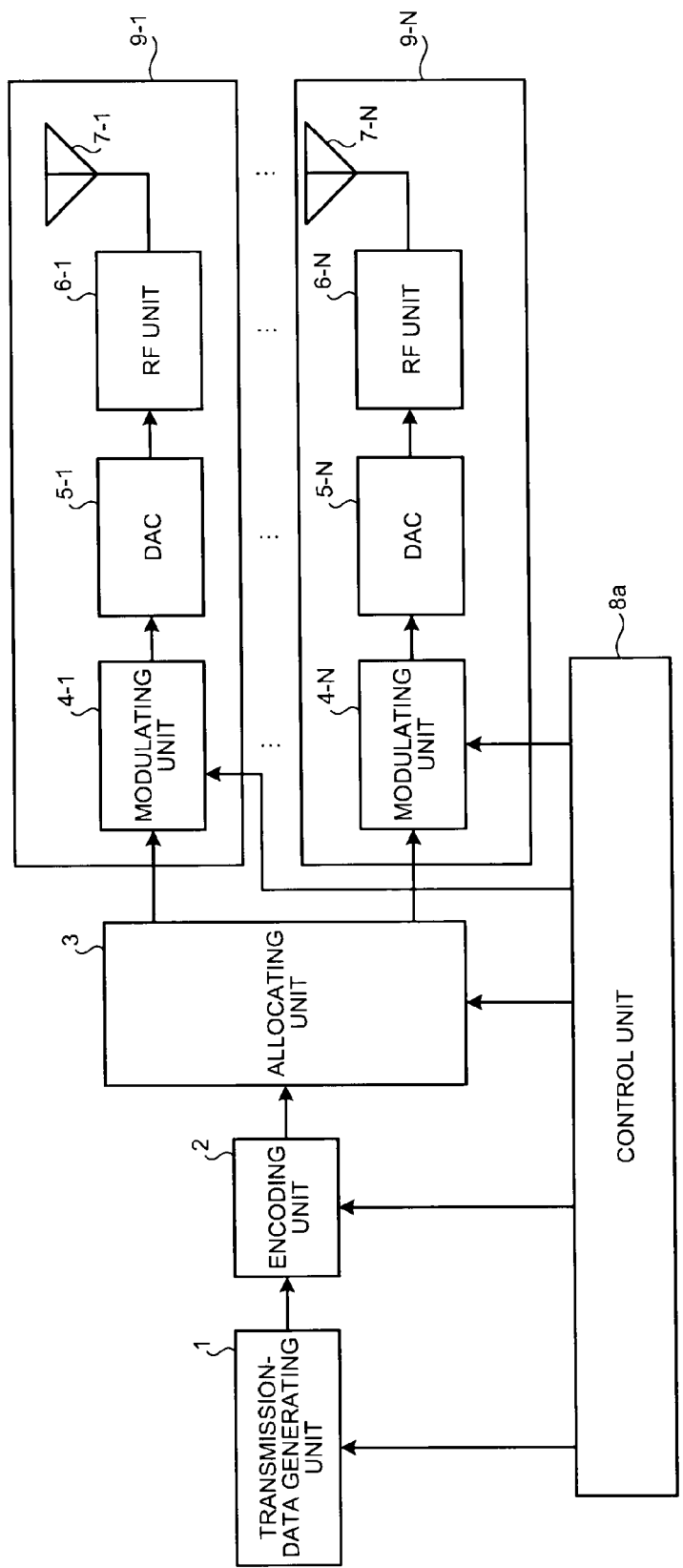
[FIG. 5]

FIG. 5 is a functional configuration example of a transmission apparatus according to a second embodiment of the transmission apparatus of the present invention. The transmission apparatus according to the present embodiment includes a control unit 8a in place of the control unit 8 of the configuration example of FIG. 1-1 of the first embodiment. The transmission apparatus is similar to that according to the first embodiment in other regards. Elements that are functionally similar to those of the first embodiment are denoted by the same reference numerals as those of FIG. 1-1 and repeated descriptions are omitted.

Figure 6:
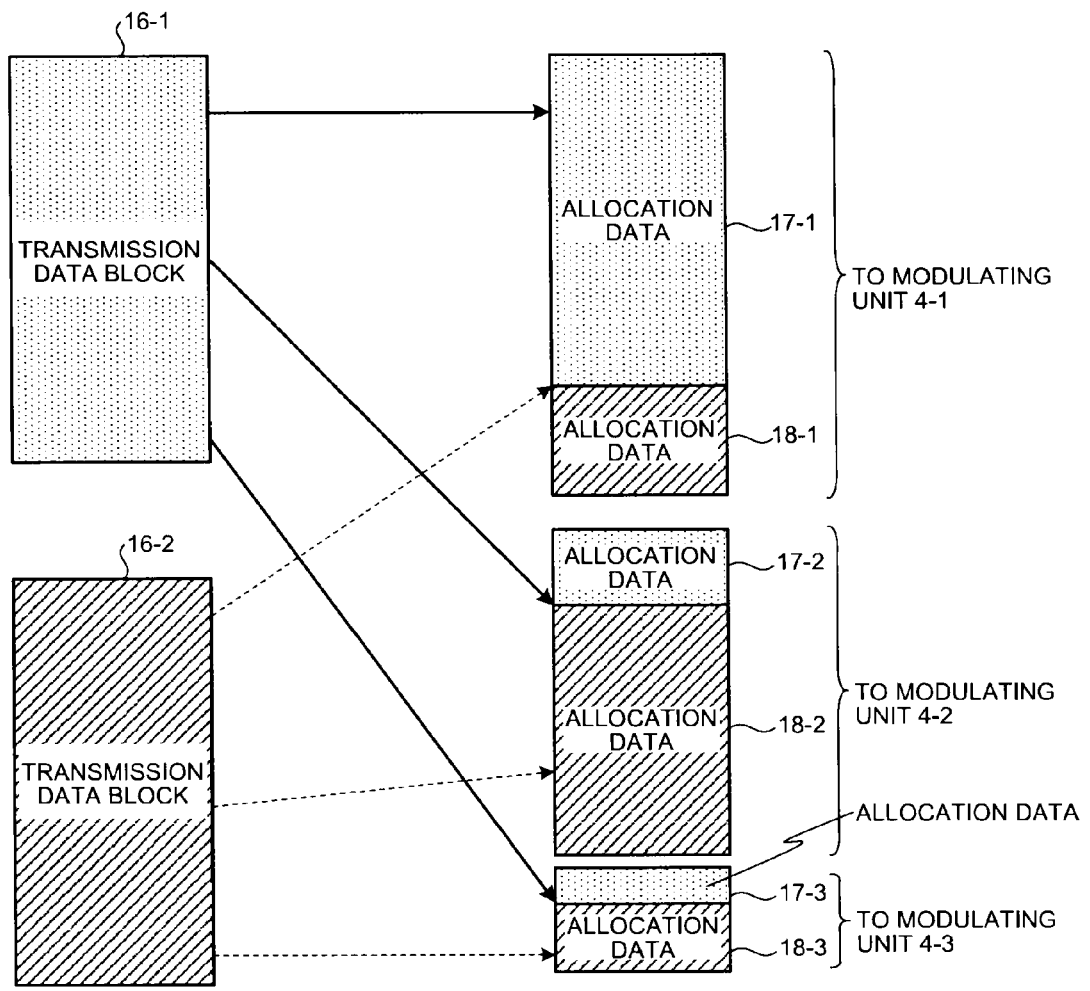
[FIG. 6]

In the present embodiment, a transmission priority level is assigned to each of the transmission data blocks, and transmission data is allocated to the transmission branches 9-1 to 9-N according to the transmission priority levels. FIG. 6 is a diagram of an example of a method for allocating transmission data blocks having undergone error correction encoding according to the present embodiment. FIG. 6 depicts the example with N=3 and DN=2. Transmission data blocks 16-1 and 16-2 in FIG. 6 are transmission data blocks having undergone error correction encoding performed by the encoding unit 2. The transmission data block 16-1 is divided into allocation data 17-1, 17-2, and 17-3 and allocated to the transmission branches 9-1, 9-2, and 9-3, respectively. The transmission data block 16-2 is divided into allocation data 18-1, 18-2, and 18-3 and allocated to the transmission branches 9-1, 9-2, and 9-3, respectively.

In the example of FIG. 6, it is assumed that a descending order of reception signal quality of the transmission branches is 9-1, 9-2, 9-3 and that 64-QAM, 16-QAM, and QPSK are selected for the transmission branch 9-1, the transmission branch 9-2, and the transmission branch 9-3, respectively, as their symbol mapping schemes. It is also assumed that a priority level of the transmission data block 16-1 is set to be higher than a priority level of the transmission data block 16-2.

In the first embodiment, each of the transmission data blocks is allocated based on the ratio among data-bit transmission rates of the transmission branches 9-1, 9-2, and 9-3. By contrast, in the present embodiment, allocation is performed, while taking the ratio among the data-bit transmission rates into consideration, such that a portion of a high-priority-level transmission data block that is allocated to a transmission branch having high reception signal quality is large. For example, in the example of FIG. 6, a descending order in reception signal quality of the transmission branches is 9-1, 9-2, 9-3. Accordingly, a large portion of the transmission data block 16-1, which has the high priority level, is allocated to the transmission branch 9-1.

Figure 7:
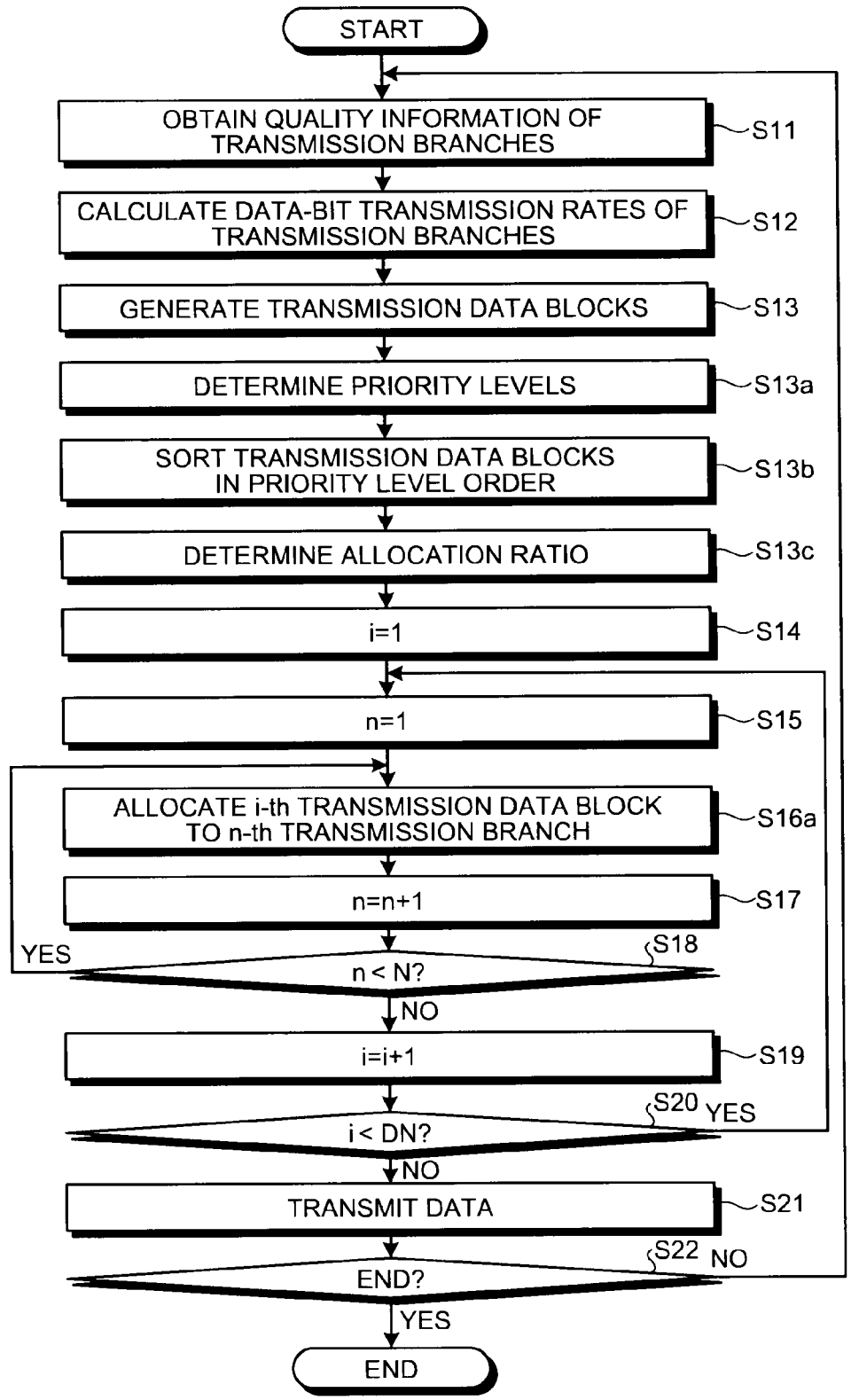
[FIG. 7]

The system control according to the present embodiment will be described. FIG. 7 is a flowchart depicting the system control according to the present embodiment. The system control according to the present embodiment differs from that according to the first embodiment in additionally including Step S13a, Step S13b, and Step S13c, and including Step S16a in place of Step S16. System control steps that are similar to those of the first embodiment will be denoted by the identical reference numerals to those of FIG. 2, and repeated descriptions are omitted.

The procedure from Step S11 to Step S13 is performed. Note that at Step S12, only information bit rates are calculated, and an allocation ratio is not output to the allocating unit 3. The control unit 8a determines data priority levels of the transmission data blocks generated at Step S13 (Step S13a). The priority levels can be determined based on, for example, QoS values of the transmission data blocks. A method for priority level determination is not limited thereto. A method for priority level determination can be provided in advance so that priority levels are set depending on data in a transmission data block. Data pieces in a single transmission data block generated at Step S13 desirably have a single priority level (for example, a single QoS value); however, the data pieces can have different priority levels. When a single block contains data contain data pieces that have different priority levels, the priority level of the single block can be set to, for example, a highest priority level among the priority levels of the single block.

The control unit 8a sorts data pieces in the transmission data blocks generated at Step S13 in a priority level order according to the priority levels determined at Step S13a (Step S13b). When a plurality of transmission data blocks having undergone error correction encoding have a single priority level, the transmission data blocks are sorted by time at which the transmission data blocks are generated.

The control unit 8a determines an allocation ratio among the transmission branches 9-1 to 9-N based on the reception signal quality information of the transmission branches 9-1 to 9-N obtained at Step S11, data-bit transmission rates of the transmission branches 9-1 to 9-N calculated at Step S12, and the priority levels determined at Step S13a (Step S13c).

The allocation ratio can be determined, for example, by the following method. DST, which is a total amount of data to be transmitted, is obtained from "DST=DS×DN" where DS is a size of a transmission data block and DN is the number of the transmission data blocks. $DST_j$, which is a total amount of data allocated to a transmission branch 9-j, is obtained from "$DST_j = DST \times A_j / \Sigma A_j$" by using a ratio "$A_j/\Sigma A_j$ (where $A_j$ is a data-bit transmission rate of the transmission branch 9-j)" between data-bit transmission rates. Allocation is performed such that a sum of amounts of data allocated to the transmission branches 9-1 to 9-N attains $DST_j$ as well as the higher the priority level of a transmission data block, the larger the ratio of the transmission data block that is allocated to high-reception signal quality one of the transmission branches 9-1 to 9-N.

In the example of FIG. 6, each of the transmission data blocks 16-1 and 16-2 is allocated to each of the transmission branches 9-1 to 9-3. For such a case, for example, how to allocate transmission data blocks to transmission branches of the best, the second best, and the third best in reception signal quality (in this example, the transmission branches 9-1, 9-2, 9-3, respectively) can be determined in advance. It can be determined in advance such that "a transmission data block that has a high priority level (in this case, the transmission data block 16-1) is allocated to the best one in reception signal quality among the transmission branches 9-1 to 9-3, to the second best one, and to the third best one in a ratio of 10:3:1", for example. In the example of FIG. 6, the number of the transmission data blocks is two. Accordingly, an amount of data of the low-priority-level transmission data block (in this case, the transmission data block 16-2) that is allocated to any one of the transmission branches 9-1 to 9-3 is obtained by subtracting an amount of data of the transmission data block 16-1 allocated to the one of the transmission branches 9-1 to 9-3 from $DST_i$ of the transmission branch.

Note that the example of FIG. 6 is only for illustration purpose, and any other method for determining an allocation ratio can be employed so long as a sum of amounts of data allocated to the transmission branches 9-1 to 9-N attains $DST_j$ as well as the higher the priority level of a transmission data block, the larger the ratio of the transmission data block that is allocated to high-reception signal quality one of the transmission branches 9-1 to 9-N. For example, allocation can be performed as follows. When the transmission branch 9-1 is the highest in reception signal quality, a transmission data block with the highest priority level is allocated to the transmission branch 9-1 until a sum of amount of data attains $DST_1$. This allocation is repeated sequentially such that the remainder of data is similarly allocated to a second best one among the transmission branches 9-1 to 9-N.

After the procedure from Step S14 to Step S15 is performed in a manner similar to that described above, the allocating unit 3 allocates an i-th transmission data block to the transmission branches 9-1 to 9-3 according to the allocation ratio at step S13c, and distributes divided data that is allocated to the transmission data block 9-n to the modulating unit 4-n (Step S16a). The procedure from Step S17 to Step S22 is performed in a manner similar to that described above.

It is possible to perform allocation while taking priority levels into consideration by replacing the control unit 8 of the functional configuration example of FIG. 1-2 to the control unit 8a and by modifying the procedure at Step S12, Step S13, Step S13C, and Step S21 of FIG. 7 as follows.

In this case, at Step S12, in a manner similar to that of the system control described above with reference to the functional configuration of FIG. 1-2 of the embodiment, an error-correction encoding rate is set for each of the transmission branches, and encoded-bit transmission rates are calculated by taking both the data-bit transmission rates and the error correction encoding rates into consideration. At Step S13, as described above as to the system control of the functional configuration of FIG. 1-2 of the embodiment, the transmission-data generating unit 1 generates information-transmission data blocks, and outputs them as transmission data blocks to the allocating unit 3 rather than to the encoding unit 2.

In the procedure at Step S13c, the encoded-bit transmission rates are used in place of the data-bit transmission rates. At Step S16c, the allocating unit 3 allocates the transmission data blocks output from the transmission-data generating unit 1 in place of the transmission data blocks output from the encoding unit 2. The encoding unit 2 performs error correction encoding of the data allocated to each of the transmission branches 9-1 to 9-N according to an error-correction encoding rate and an encoding scheme which are specified by the control unit 8a. The data having undergone the error correction encoding is output to the modulating unit 4-n as allocation data. At Step S21, the modulating unit 4-n performs signal processing of the allocation data output from the encoding unit 2 in place of the allocation data output from the allocating unit 3.

It is possible to decrease retransmission frequency by causing the allocation ratio among the transmission branches 9-1 to 9-N to vary depending on the priority levels of the transmission data blocks as described above; furthermore, for example, when HARQ is employed, by setting priority levels of retransmission packets higher than a priority level of a first transmission packet. This is because retransmission packets are transmitted via high-reception signal quality one of the transmission branches 9-1 to 9-N, it is possible to cause further retransmission to occur less probably. Accordingly, for example, when a size of circuit is limited as in the case of a mobile terminal, it is possible to use buffer memory with a smaller capacity for HARQ.

As described above, in the present embodiment, a priority levels of the transmission data blocks are set such that the higher the priority level of a transmission data block, the larger the ratio of the transmission data block that is allocated to high-reception signal quality one of the transmission branches 9-1 to 9-N. Accordingly, data of high-priority level can be transmitted with high quality. When HARQ is adopted, because frequency of retransmission of HARQ can be decreased, advantages such as improvement of throughput, reduction in size of a circuit and power consumption of a terminal, and downsizing are obtained.

Third Embodiment

Figure 8:
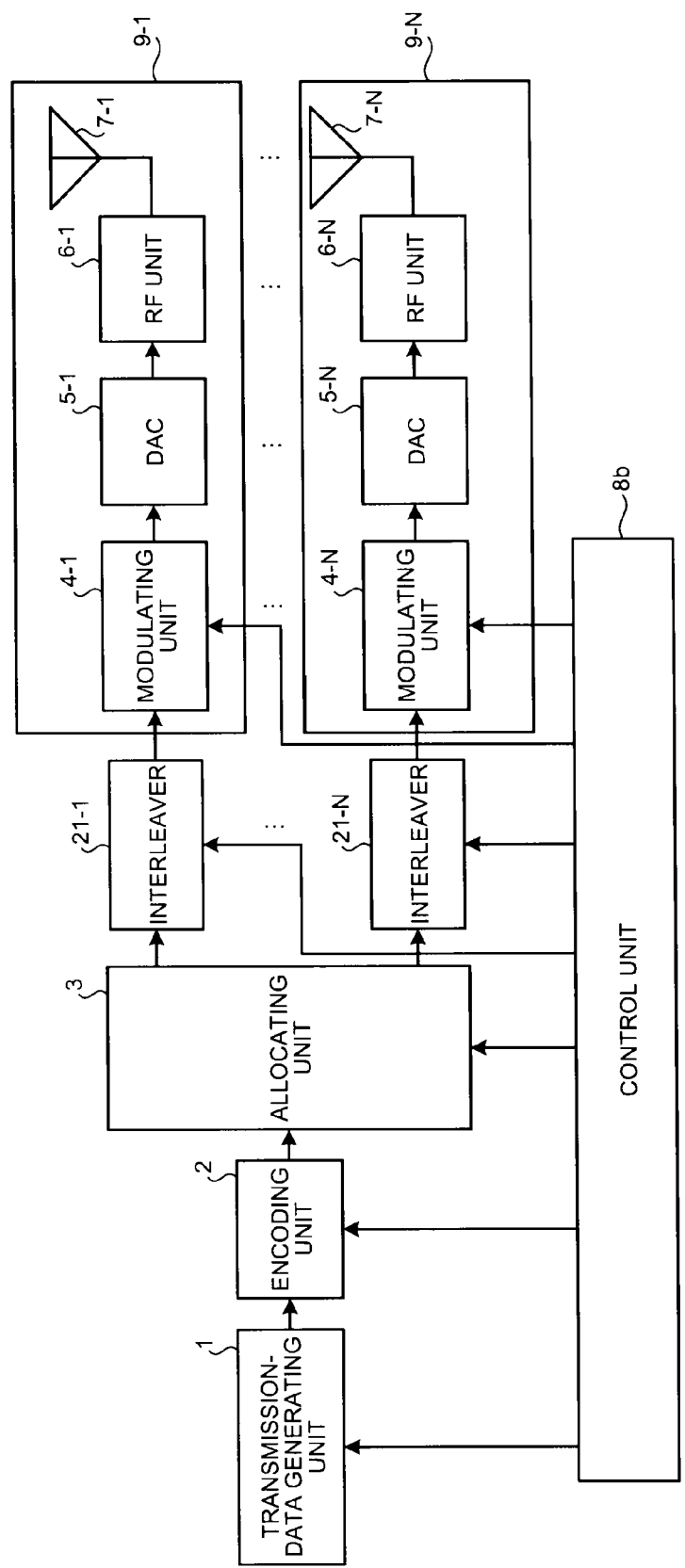
[FIG. 8]

FIG. 8 is a functional configuration example of a transmission apparatus according to a third embodiment of the present invention. The transmission apparatus according to the present embodiment includes, in addition to the functional configuration example of FIG. 1-1 according to the first embodiment, interleavers 21-1 to 21-N that perform interleaving, and includes a control unit 8b in place of the control unit 8 of the first embodiment. The control unit 8b has, in addition to the functions of the control unit 8 of the first embodiment, a function of providing specification about interleaving schemes to the interleavers 21-1 to 21-N. The transmission apparatus is similar to that according to the first embodiment in other regards. Elements that are functionally similar to those of the first embodiment are denoted by the same reference numerals as those of FIG. 1-1 and repeated descriptions are omitted.

The system control to be performed by the transmission apparatus according to the present embodiment will be described. The system control according to the present embodiment is similar to that according to the first embodiment or the second embodiment except for that the interleavers 21-1 to 21-N interleave data allocated by the allocating unit 3 and output the interleaved data to the modulating units 4-1 to 4-N. The difference in system control between the present embodiment and the first embodiment or the second embodiment will be described below.

In the present embodiment, the procedure from Step S11 to Step S15 shown in FIG. 2 according to the first embodiment or the procedure from Step S11 to Step S15 shown in FIG. 7 according to the second embodiment is performed. The allocating unit 3 allocates data to the modulating units 4-1 to 4-N at Step S16 in the first embodiment or at Step S16a in the second embodiment. In contrast, in the present embodiment, the allocating unit 3 allocates data, which is to be allocated to each of the transmission branches, to the interleavers 21-1 to 21-N of the same subnumbers as those of the transmission branches. Each of the interleavers 21-1 to 21-N interleaves data output from the allocating unit 3 based on the interleaving scheme specified by the control unit 8b, and outputs the interleaved data to each one of the modulating units 4-1 to 4-N having the same subnumber. Subsequent procedure is the same as that of the first embodiment.

On the reception side, de-interleaving, which is the reverse of the operations performed by the interleavers 21-1 to 21-N, is performed to return relative positions of bits of transmitted data to their original positions. By additionally performing interleaving, data bits of each of the transmission branches are distributed in terms of time, and an effect of error correcting encoding is enhanced.

In the present embodiment, the interleavers 21-1 to 21-N have been described as a functional block separated from the allocating unit 3; however, the interleaving can be performed by the allocating unit 3. In this case, the interleavers 21-1 to 21-N can be omitted.

The interleaving can be added, in a manner similar to the present embodiment, to the functional configuration example of FIG. 1-2 according to the first embodiment or to the functional configuration example of FIG. 1-2 to which priority level processing is added as described in the second embodiment. In this case, the interleavers 21-1 to 21-N are positioned upstream of the modulating units 4-1 to 4-N. The procedure is similar to the procedure according to the first embodiment, the second embodiment, or the present embodiment described above except for that the allocation data output from the encoding unit 2 of FIG. 1-2 according to the first embodiment is input to the interleavers 21-1 to 21-N.

As described above, in the present embodiment, the interleavers 21-1 to 21-N are additionally provided so that interleaving of the transmission branches 9-1 to 9-N is performed on a transmission-branch-by-transmission-branch basis. Accordingly, transmission quality can be improved as compared with that of the first embodiment and the second embodiment.

Fourth Embodiment

Figure 9:
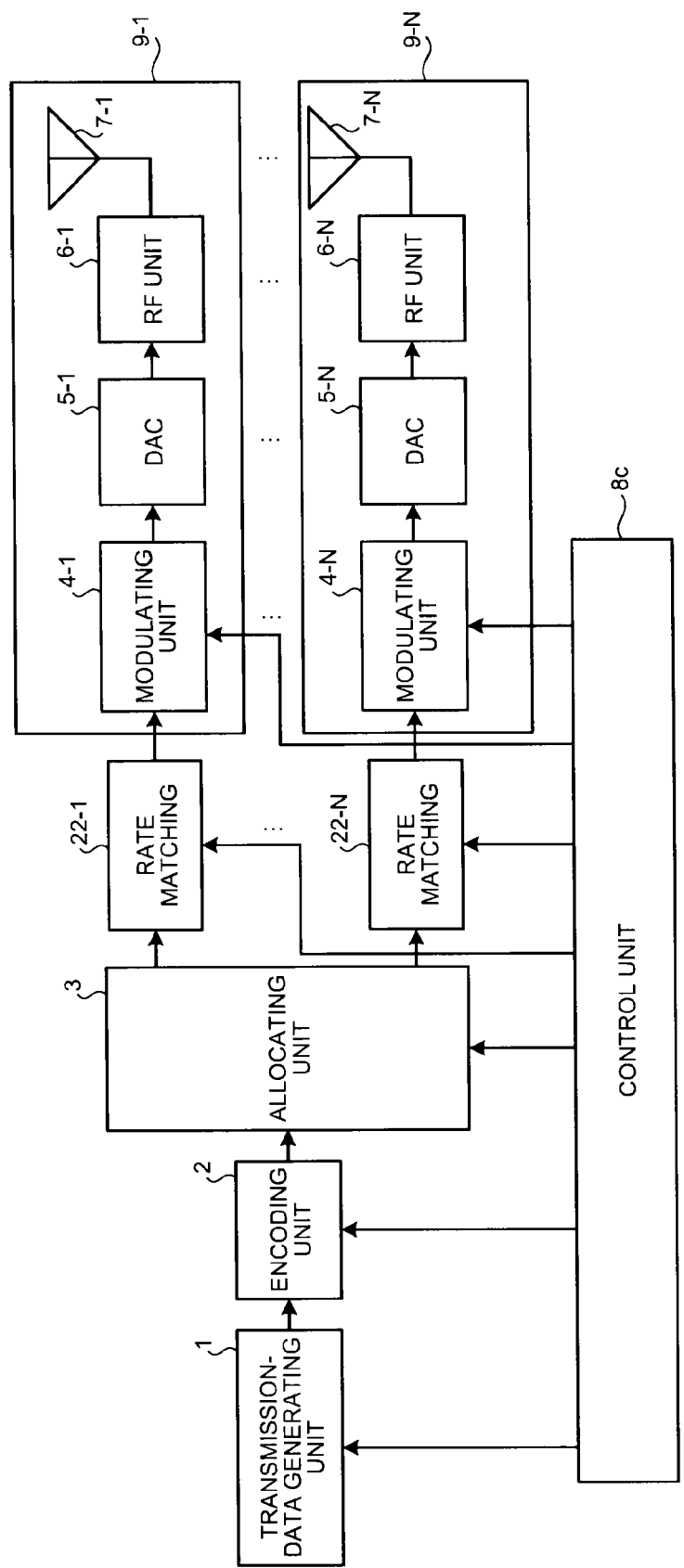
[FIG. 9]

FIG. 9 is a functional configuration example of a transmission apparatus according to a fourth embodiment of the present invention. The transmission apparatus according to the present embodiment includes, in addition to the functional configuration example of FIG. 1-1 according to the first embodiment, rate matchings 22-1 to 22-N that perform rate matching, and includes a control unit 8c in place of the control unit 8 of the first embodiment. The control unit 8c has, in addition to the functions of the control unit 8 of the first embodiment, a function of providing specification about rate matching schemes to the rate matchings 22-1 to 22-N. The transmission apparatus is similar to that according to the first embodiment in other regards. Elements that are functionally similar to those of the first embodiment are denoted by the same reference numerals as those of FIG. 1-1 and repeated descriptions are omitted.

The system control to be performed by a reception apparatus according to the present embodiment will be described. The system control according to the present embodiment is similar to that according to the first embodiment or the second embodiment except for that the rate matchings 22-1 to 22-N perform rate matching of data allocated by the allocating unit 3 and output the rate-matched data to the modulating units 4-1 to 4-N, and that the control unit 8c calculates data-bit transmission rates while taking the rate matching into account. The difference in system control between the present embodiment and the first embodiment or the second embodiment will be described below.

In the present embodiment, the procedure at Step S11 pertaining to the first embodiment or the second embodiment shown in FIG. 2 is performed. As is performed at Step S12 pertaining to the first embodiment or the second embodiment, the control unit 8c selects a symbol mapping scheme for each of the transmission branches 9-1 to 9-N based on the reception signal quality information, which is obtained at Step S11, of the transmission branches 9-1 to 9-N. The control unit 8c calculates data-bit transmission rates and provides specification about an allocation method to the allocating unit 3. In this example, it is assumed that the data-bit transmission rates are transmission rates of data bits that are not subjected to rate matching yet. Accordingly, allocation ratio is the ratio among values of modulation orders as in the case of the first embodiment.

The procedure from Step S13 to Step S15 pertaining to the first embodiment or the procedure from Step S13 to Step S15 pertaining to the second embodiment is performed. The allocating unit 3 distributes data to the modulating units 4-1 to 4-N at Step S16 pertaining to the first embodiment, or at Step S16a pertaining to the second embodiment. In contrast, in the present embodiment, the allocating unit 3 outputs data, which is to be allocated to the transmission branches, to each one of the rate matchings 22-1 to 22-N that has the same subnumber as that of the transmission branch. The rate matchings 22-1 to 22-N convert transmission rates of the data output from the allocating unit 3 based on the rate matching schemes specified by the control unit 8c and output the data to a corresponding one of the modulating units 4-1 to 4-N that has the same subnumber. Examples of the rate matching scheme include puncturing (removing some of encoded bits) and repetition (repeating some of encoded bits). Subsequent procedure is the same as that of the first embodiment.

On the reception side, processing of bringing the data-bit transmission rates changed by the rate matchings 22-1 to 22-N back to their original rates (rate de-matching) is performed.

In the present embodiment, as in the case of the first embodiment and the second embodiment, the ratio among values of modulation orders (transmission rates of data bits) is employed as a ratio based on which the allocating unit 3 performs distribution; however, the distribution ratio is not limited thereto. For example, by making use of the fact that a transmission rate can be adjusted by rate matching, an arbitrary allocation ratio within a range where the transmission rate is adjustable by rate matching can be employed.

By additionally performing the rate matching as described above, the transmission rate of each of the transmission branches 9-1 to 9-N can be adjusted more finely than that adjusted by control of only the modulation orders. Accordingly, the transmission rate of each of the transmission branches 9-1 to 9-N can be selected more appropriately as compared with the first embodiment through the third embodiment.

Figure 10:
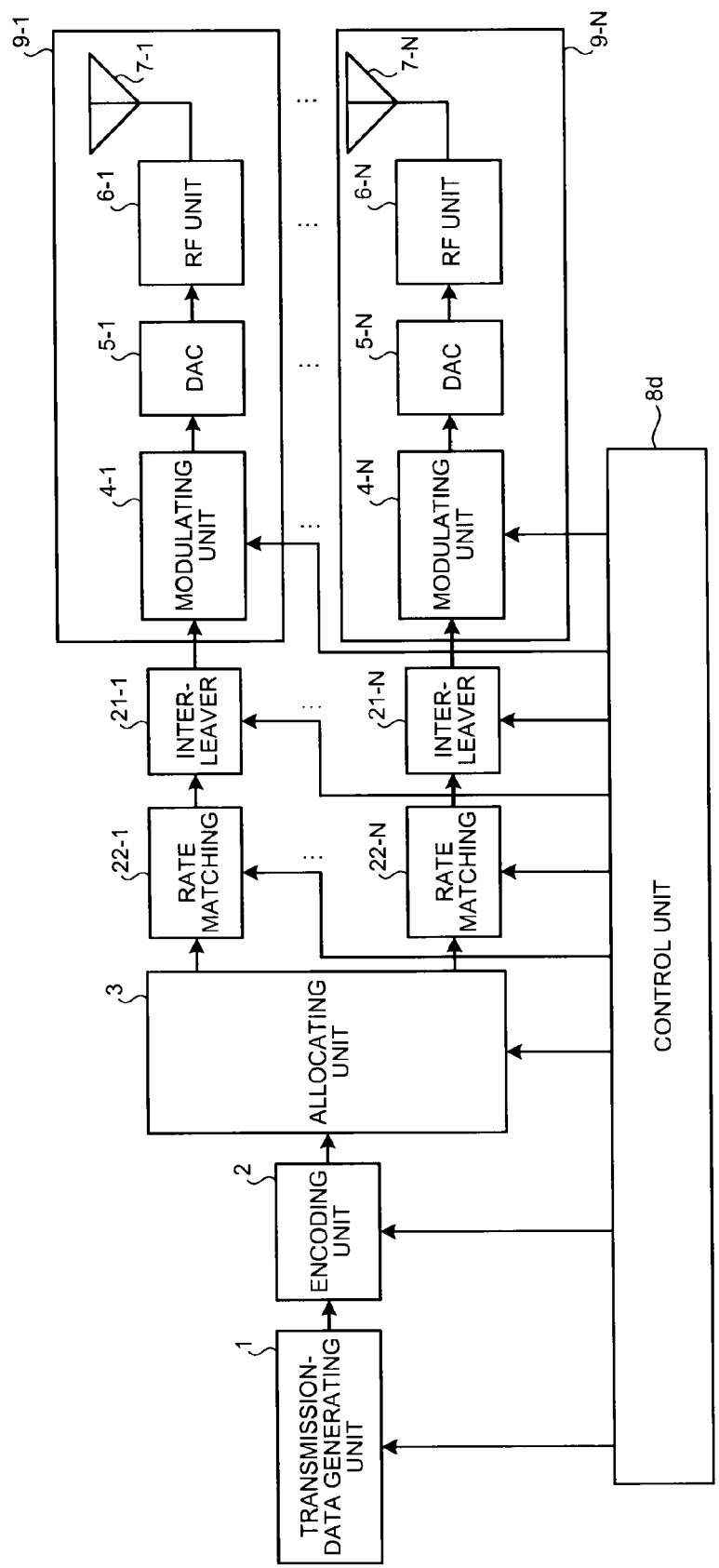
[FIG. 10]

The rate matchings 22-1 to 22-N of the present embodiment can be added to the third embodiment. FIG. 10 is a functional configuration example, to which the rate matchings 22-1 to 22-N are added, according to the third embodiment. In the example shown in FIG. 10, the rate matchings 22-1 to 22-N are added to the configuration of the third embodiment, and a control unit 8d that additionally includes a control function related to the rate matching is provided in place of the control unit b. As shown in FIG. 10, the rate matchings 22-1 to 22-N are positioned upstream of the interleavers 21-1 to 21-N in the transmission branches 9-1 to 9-N so that the interleavers 21-1 to 21-N interleave rate-matched data. With such a configuration, improvement in error correction capability by virtue of the interleaving and appropriate selection of transmission rate by virtue of the rate matching can be simultaneously achieved.

The rate matching can be added, in a manner similar to the present embodiment, to the functional configuration example of FIG. 1-2 pertaining to the first embodiment or to the functional configuration example of FIG. 1-2 to which priority level processing is added as described in the second embodiment. In this case, the rate matchings 22-1 to 22-N are positioned upstream of the modulating units 4-1 to 4-N. The procedure is similar to the procedure according to the first embodiment, the second embodiment, or the present embodiment described above except for that allocation data output from the encoding unit 2 at Step S16 of the system control with the functional configuration example of FIG. 1-2 pertaining to the first embodiment is input to the rate matchings 22-1 to 22-N.

As described above, in the present embodiment, the rate matchings 22-1 to 22-N are additionally provided so that the transmission rate of each of the transmission branches 9-1 to 9-N can be selected in fine increments. Accordingly, as compared with the first through third embodiments, the transmission rates can be set more appropriately. Furthermore, the distribution ratio of transmission data among the transmission branches 9-1 to 9-N can be selected with a higher degree of freedom.

Fifth Embodiment

Figure 11:
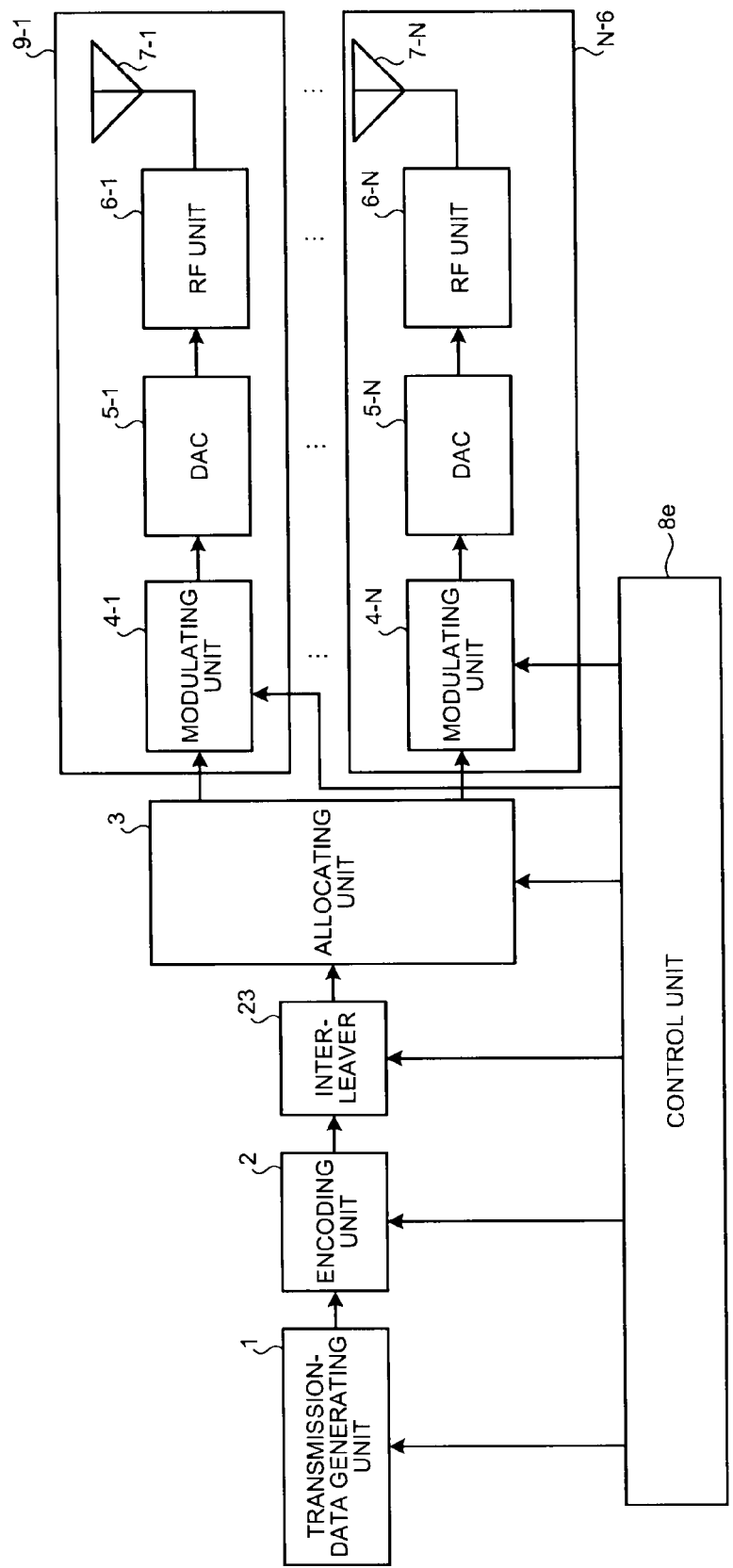
[FIG. 11]

FIG. 11 is a functional configuration example of a transmission apparatus according to a fifth embodiment of the present invention. The transmission apparatus according to the present embodiment includes, in addition to the functional configuration example of FIG. 1-1 according to the first embodiment, an interleaver 23 that performs interleaving, and includes a control unit 8e in place of the control unit 8 of the first embodiment. The control unit 8e has, in addition to the functions of the control unit 8 of the first embodiment, a function of providing specification of an interleaving scheme to the interleaver 23. The transmission apparatus is similar to the transmission apparatus according to the first embodiment in other regards. Elements that are functionally similar to those of the first embodiment are denoted by the same reference numerals as those of FIG. 1-1 and repeated descriptions are omitted.

In the third embodiment, each of the transmission branches 9-1 to 9-N has a corresponding one of the interleavers 21-1 to 21-N which are positioned downstream of the allocating unit 3. In contrast, in the present embodiment, the interleaver 23 is positioned upstream of the allocating unit 3 and interleaves data that is not allocated to the transmission branches 9-1 to 9-N yet.

The system control to be performed by the transmission apparatus according to the present embodiment will be described. The system control according to the present embodiment differs from that according to the first embodiment or the second embodiment in the following respects. In the first embodiment, the encoding unit 2 outputs a transmission data block to the allocating unit 3. In contrast, in the present embodiment, the encoding unit 2 outputs a transmission data block to the interleaver 23. The interleaver 23 interleaves the transmission data block and outputs the interleaved transmission data block to the allocating unit 3. Except for this operation, the present embodiment and the first embodiment or the second embodiment are similar to each other in system control. The difference in system control between the present embodiment and the first embodiment or the second embodiment will be described below.

In the present embodiment, the procedure from Step S11 to Step S13 shown in FIG. 2 pertaining to the first embodiment is performed. The interleaver 23 interleaves a transmission data block based on the interleaving scheme specified by the control unit 8e. The interleaving scheme specified by the control unit 8e can be a scheme of individually interleaving a transmission data block or a scheme of collectively interleaving a plurality of transmission data blocks. When the latter scheme is employed, the number of transmission data blocks that are to be collectively interleaved is selected in advance or in an adaptive manner while taking conditions of transmission paths, the size of transmission data blocks to be generated, and the like into consideration. The interleaver 23 outputs the interleaved transmission data block to the allocating unit 3. Subsequent procedure is the same as the procedure at Step S14 and subsequent steps pertaining to the first embodiment, or the procedure at Step S13a and subsequent steps pertaining to the second embodiment.

The interleaving can be added, in a manner similar to the present embodiment, to the functional configuration example of FIG. 1-2 pertaining to the first embodiment or to the functional configuration example of FIG. 1-2 to which priority level processing is added as described in the second embodiment. In this case, the interleaver 23 is positioned upstream of the allocating unit 3. The information-transmission data block output from the transmission-data generating unit 1 at Step S13 of the system control with the functional configuration example of FIG. 1-2 pertaining to the first embodiment is output to the interleaver 23. The interleaver 23 performs the interleaving, which has been described in the present embodiment, of the information-transmission data block and thereafter outputs the interleaved transmission data block to the allocating unit 3. Subsequent procedure is the same as the procedure at Step S14 and subsequent steps of the system control with the functional configuration example of FIG. 1-2 pertaining to the first embodiment, or the procedure at Step S13a and subsequent steps pertaining to the second embodiment.

As described above, in the present embodiment, the interleaver 23 is additionally provided so that interleaving is performed. Accordingly, transmission quality can be further improved as compared with that of the first embodiment and the second embodiment.

Sixth Embodiment

FIG. 12 is a functional configuration example of a transmission apparatus according to a sixth embodiment of the present invention. The transmission apparatus according to the present embodiment includes, in addition to the functional configuration example of FIG. 1-1 pertaining to the first embodiment, a rate matching 24 that performs rate matching, and includes a control unit 8f in place of the control unit 8 of the first embodiment. The control unit 8f has, in addition to the functions of the control unit 8 of the first embodiment, a function of providing specification about a rate matching scheme to the rate matching 24. The transmission apparatus is similar to that according to the first embodiment in other regards. Elements that are functionally similar to those of the first embodiment are denoted by the same reference numerals as those of FIG. 1-1 and repeated descriptions are omitted.

In the fourth embodiment, each of the transmission branches 9-1 to 9-N has a corresponding one of the rate matchings 22-1 to 22-N which are positioned downstream of the allocating unit 3. In contrast, in the present embodiment, the rate matching 24 is positioned upstream of the allocating unit 3 and performs rate matching of data that is not allocated to the transmission branches 9-1 to 9-N yet.

The system control to be performed by the transmission apparatus according to the present embodiment will be described. The system control according to the present embodiment differs from that according to the first embodiment or the second embodiment in the following respects. In the first embodiment, the encoding unit 2 outputs a transmission data block to the allocating unit 3. In contrast, in the present embodiment, the encoding unit 2 outputs a transmission data block to the rate matching 24. The rate matching 24 performs rate matching of the transmission data block and outputs the rate-matched transmission data block to the allocating unit 3. Except for this operation, the present embodiment and the first embodiment or the second embodiment are similar to each other in system control. The difference in system control between the present embodiment and the first embodiment or the second embodiment will be described below.

In the present embodiment, the procedure from Step S11 to Step S13 shown in FIG. 2 pertaining to the first embodiment is performed. The rate matching 24 performs rate conversion (rate matching) such as puncturing or repetition of a transmission data block that has undergone error correction encoding based on the rate matching scheme specified by the control unit 8f. The rate matching 24 outputs the interleaved transmission data block to the allocating unit 3. Subsequent procedure is the same as the procedure at Step S14 and subsequent steps pertaining to the first embodiment.

In the present embodiment, the transmission apparatus according to the first embodiment additionally includes the rate matching 24. Alternatively, the transmission apparatus according to any one of the second, third, and fifth embodiments can additionally include the rate matching 24. By adding a function of providing specification about a rate matching scheme to the rate matching 24 to a corresponding one of the control unit 8, 8a, 8b, and 8e the rate matching 24 can perform rate matching similar to that of the present embodiment.

By addition of the rate matching, the transmission rate can be adjusted further more finely than the first to the third embodiments. Because it is required to additionally have only the rate matching 24, the hardware configuration can be simplified as compared with that of the fourth embodiment.

Seventh Embodiment

Figure 13:
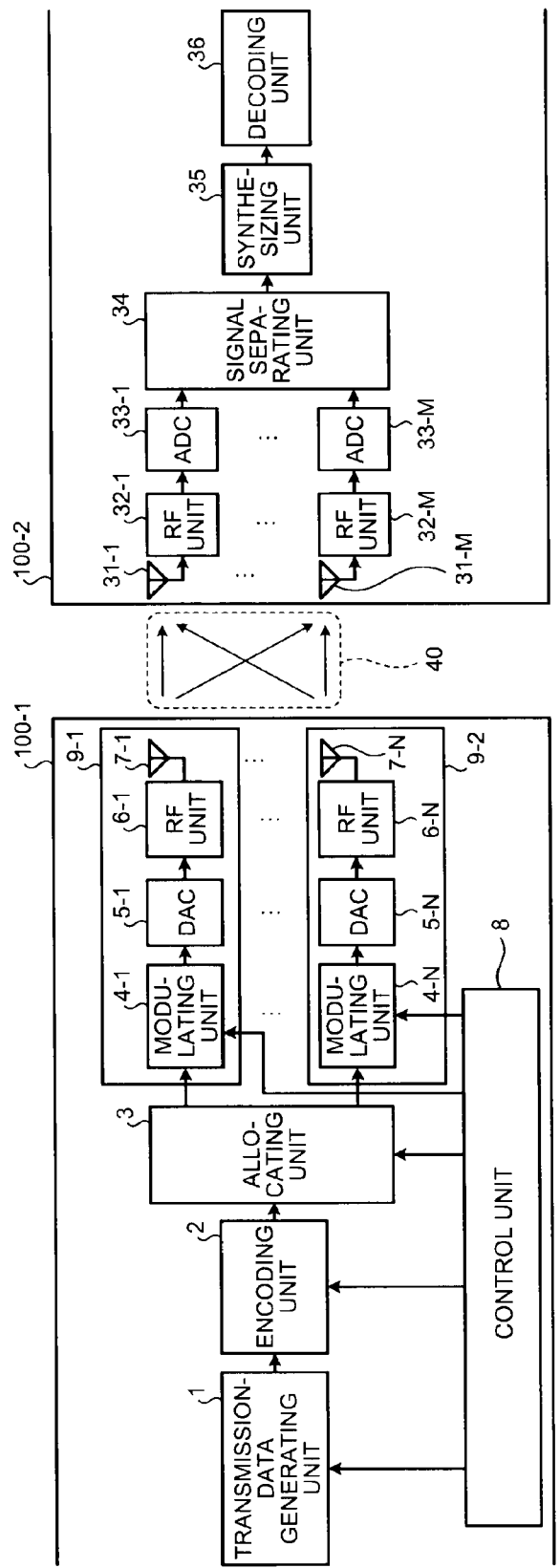
[FIG. 13]

FIG. 13 is a functional configuration example of a communication apparatus according to a seventh embodiment of the present invention. The communication apparatus according to the present embodiment includes receiving antennas 31-1 to 31-M (M is the number of the receiving antennas), RF units 32-1 to 32-M, ADCs 33-1 to 33-M, a signal separating unit 34, a combining unit 35, and a decoding unit 36 in addition to a communication apparatus pertaining the functional configuration example of FIG. 1-1 of the first embodiment. Elements that are functionally similar to those of the first embodiment are denoted by the same reference numerals as those of FIG. 1-1 and repeated descriptions are omitted. Hereinafter, the functional configuration unit similar to that of the first embodiment is referred to as a transmitting unit, while the receiving antennas 31-1 to 31-M (M is the number of the receiving antennas), the RF units 32-1 to 32-M, the ADCs 33-1 to 33-M, the signal separating unit 34, the combining unit 35, and the decoding unit 36 are referred to as a receiving unit. Identically-configured communication apparatuses 100-1 and 100-2 are depicted in FIG. 13, in which the transmitting unit of the communication apparatus 100-1 and the receiving unit of the communication apparatus 100-2 are shown. Although not shown, the communication apparatus 100-1 includes the receiving unit as does the communication apparatus 100-2, and the communication apparatus 100-2 includes the transmitting unit as does the communication apparatus 100-1. MIMO transmission channels 40 are a transmission path through which signals are transmitted from the transmitting antennas 7-1 to 7-N and through which signals are received by the receiving antennas 31-1 to 31-M.

Whether the relationship between N, the number of the transmitting antennas, and M, the number of the receiving antennas, is restricted depends on the type of signal separation processing performed by the signal separating unit 34. When the signal separating unit 34 performs spatial filtering as the signal separation processing, it is necessary to satisfy: $N \leq M$. When the signal separating unit 34 performs maximum likelihood detection (MLD) as the signal separation processing, because signals can be separated even when $N > M$ holds, there is no restriction on the relationship between N and M. In the present embodiment, there is no restriction on the type of the signal separation processing to be performed by the signal separating unit 34; however, when the signal separation processing is performed by spatial filtering, it is required to satisfy the above relationship between N and M.

The system control to be performed by the communication apparatus according to the present embodiment will be described below. An example in which radio waves are transmitted from the transmitting unit of the communication apparatus 100-1 and received by the receiving unit of the communication apparatus 100-2 will be described. Because the system control to be performed by the transmitting unit according to the present embodiment is similar to that of the first embodiment, repeated descriptions are omitted, and the difference in system control between the present embodiment and the first embodiment will be described below.

Signals are transmitted from the transmitting unit of the communication apparatus 100-1 by processing shown in FIG. 2 pertaining to the first embodiment. The transmitted signals reach the receiving antennas 31-1 to 31-M of the communication apparatus 100-2 through the MIMO transmission channels 40. The receiving antennas 31-1 to 31-M receive the signals having been transmitted through the MIMO transmission channels 40 and output the signals to one of the RF units 32-1 to 32-M that has the same subnumber as that of the antenna. Each of the RF units 32-1 to 32-M performs predetermined analog signal processing such as frequency conversion, amplification, and filtering, and outputs the signals to one of the ADCs 33-1 to 33-M that has the same subnumber as that of the antenna. The ADCs 33-1 to 33-M perform analog-to-digital conversion of the signals output from the RF units 32-1 to 32-M, and output the signals to the signal separating unit 34.

The signal separating unit 34 separates encoded data bits from the signals output from the RF units 32-1 to 32-M, and outputs the encoded data bits to the combining unit 35. When the signals are OFDM signals or ODFMA signals, the signal separating unit 34 also performs subcarrier separation. The combining unit 35 reconstructs the encoded data bits output from the signal separating unit 34 into not-yet-allocated data, which is the data not yet subjected to the allocation performed by the allocating unit 3 on the transmission side, and outputs the not-yet-allocated data to the decoding unit 36. The decoding unit 36 performs error correction decoding or HARQ processing of the reconstructed data block output from the combining unit 35.

The present embodiment has employed the transmission apparatus shown in FIG. 1-1 according to the first embodiment; however, the present embodiment is not limited thereto, and the transmission apparatus shown in FIG. 1-2 according to the first embodiment, or according to any one of the second to sixth embodiments can be employed. In this case, when a communication apparatus according to the third embodiment or the fifth embodiment is employed as the transmitting unit, the receiving unit additionally includes deinterleaving to perform the reverse of the interleaving performed by the transmitting unit. When a communication apparatus according to the fourth embodiment or the sixth embodiment is employed as the transmitting unit, the receiving unit additionally includes rate de-matching to perform the reverse of the rate matching performed by the transmitting unit.

As described above, in the present embodiment, a signal mapping scheme is selected for each of the transmission branches 9-1 to 9-N based on the reception signal quality information of the transmission branches 9-1 to 9-N so that the transmission branches 9-1 to 9-N can have different data-bit transmission rates. Accordingly, a communication system that includes the communication apparatus can offer high transmission quality by interleaving of spatial streams as well as improve spectral efficiency as compared with that attained by conventional interleaving of spatial streams.

Eighth Embodiment

Figure 14:
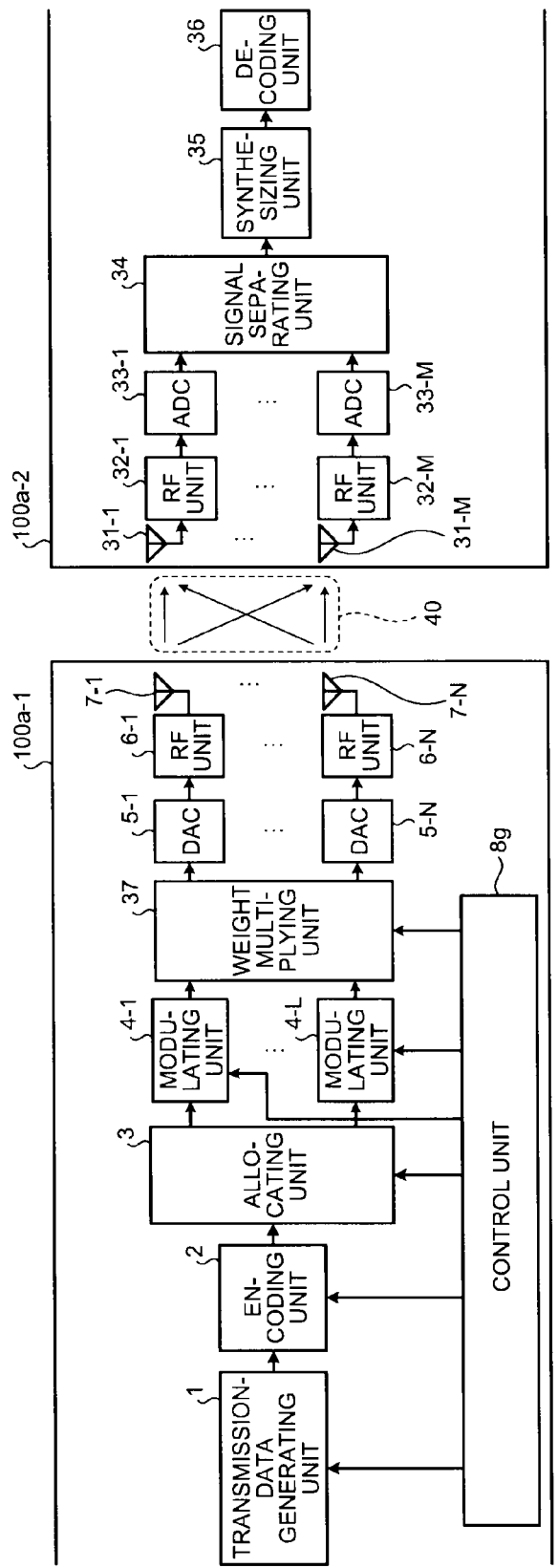
[FIG. 14]

FIG. 14 is a functional configuration example of a communication apparatus according to an eighth embodiment of the present invention. The communication apparatus according to the present embodiment includes, in addition to the functional configuration according to the seventh embodiment, a weight multiplying unit 37. The communication apparatus includes a signal separating unit 34a in place of the signal separating unit 34a and a control unit 8g in place of the control unit 8. The number of the modulating units 4 is changed to L. The control unit 8g provides specification about a weight multiplying method to the weight multiplying unit 37. Elements that are functionally similar to those of the first embodiment or the seventh embodiment are denoted by the same reference numerals as those of FIG. 1-1 and FIG. 13 and repeated descriptions are omitted. Identically-configured communication apparatuses 100a-1 and 100a-2 are depicted in FIG. 14, in which the transmitting unit of the communication apparatus 100a-1 and the receiving unit of the communication apparatus 100a-2 are shown. Although not shown, the communication apparatus 100a-1 includes the receiving unit as does the communication apparatus 100a-2, and the communication apparatus 100a-2 includes the transmitting unit as does the communication apparatus 100a-1.

In the present embodiment, the N transmitting antennas form L transmission beams, which are independently associated with L spatial streams. Examples of such a technology that uses transmission beams and transmitting antennas of which number differs from that of the transmission beams includes eigenbeam-space division multiplexing (E-SDM) that is described in Ohgane Takeo, Nishimura Toshihiko, and Ogawa Yasutaka, "Applications of space division multiplexing and those performance in a MIMO channel", the transactions of the Institute of Electronics, Information and Communication Engineers, B, Vol. J87-B, No. 9, pp. 1162-1173, September 2004. E-SDM is capable of attaining transmission quality higher than that attained by general SDM.

The system control to be performed by the communication apparatus according to the present embodiment will be described. The difference in system control between the present embodiment and the first embodiment or the seventh embodiment will be described below. In the present embodiment, the transmitting unit of the communication apparatus 100a-1 performs the procedure at Step S11 pertaining to the first embodiment. The transmitting unit selects a signal mapping scheme of each of the transmission beams based on reception signal quality information of the transmission beams, calculates data-bit transmission rates of the transmission beams, and provides specification about allocation ratio to the allocating unit 3 in a manner similar to that at Step S12. The procedure from Step S13 to Step S15 pertaining to the first embodiment is performed. Note that not n but k is used at Step S1d. At Step S16, the allocating unit 3 does not allocate data to an n-th transmission branch but allocates the data to a k-th transmission beam, and outputs the data to the modulating unit 4-k.

The procedure from Step S17 to Step S20 pertaining to the first embodiment is performed. Note that not n but k, and not N but L are used at Step S17 and Step S18. The weight multiplying unit 37 performs weight multiplexing, which will be described later, according to the weight multiplexing method specified by the control unit 8g. Subsequent procedure is the same as the procedure at Step S21 and subsequent steps pertaining to the first embodiment.

The system control to be performed by the receiving unit of the communication apparatus 100a-2 is similar to that according to the seventh embodiment. In contrast to the signal separating unit 34 of the seventh embodiment, the signal separating unit 34a of the present embodiment separates encoded data bits on a transmission-beam-by-transmission-beam basis. The combining unit 35 reconstructs the encoded data bits into not-yet-allocated data blocks.

The weight multiplexing to be performed by the weight multiplying unit 37 will be described. Outputs of the modulating units 4-1 to 4-L of the communication apparatus 100a-1 is expressed as a vector $A=[a_1, \ldots, a_L]^T$ where $a_n$ is an output signal of the modulating unit 4-n, and $[\ ]^T$ indicates a transposed vector. Similarly, the output signals (input signals to the DACs 5-1 to 5-N) are expressed as a vector $B=[b_1, \ldots, b_N]^T$ where $b_n$ is an input signal to the DAC 5-n.

When a transmission weight matrix W is assumed as an N×L matrix, an output of the weight multiplying unit 37 is a product of the transmit weight matrix and A; that is, $B=WA$. The transmit weight matrix W is calculated according to a method for calculating a weight matrix in E-SDM. Information necessary for calculation of a weight matrix and the like is provided by the control unit 8g as the weight multiplexing method.

The communication apparatus 100a-2 divides output signals from the ADCs 33-1 to 33-M into data blocks on a transmission-beam-by-transmission-beam basis. The combining unit 35 performs the reverse of the allocation performed by the allocating unit 3 to reconstruct the data based on the allocation method performed by the allocating unit 3.

The transmitting unit can have the structure of the functional configuration example of FIG. 1-2 pertaining to the first embodiment, with the number of the modulating units 4 changed to L, while the transmitting unit includes the control unit 8g in place of the control unit 8. The control unit 8g provides specification about a weight multiplying method to the weight multiplying unit 37. In this case, the procedure up to Step S15 described above pertaining to the functional configuration example of FIG. 1-2 pertaining to the first embodiment (note that n is to be replaced to k as in the above description) is performed. At Step S16, the allocating unit 3 does not allocate data to the n-th transmission branch but to the k-th transmission beam, and outputs the data to the encoding unit 2. The encoding unit 2 performs error correction encoding, and outputs the error-correction encoded data to the modulating unit 4-k as allocation data. The procedure at Step S17 and subsequent steps is the same as the procedure at Step S18 and subsequent steps pertaining to the first embodiment.

As described above, in the present embodiment, the number of the transmission beams is not equal to that of the transmitting antennas, and weight multiplication of data is performed on a transmission-beam-by-transmission-beam basis. Accordingly, transmission quality can be further increased as compared with that of the first to seventh embodiments.

Ninth Embodiment

Figure 15:
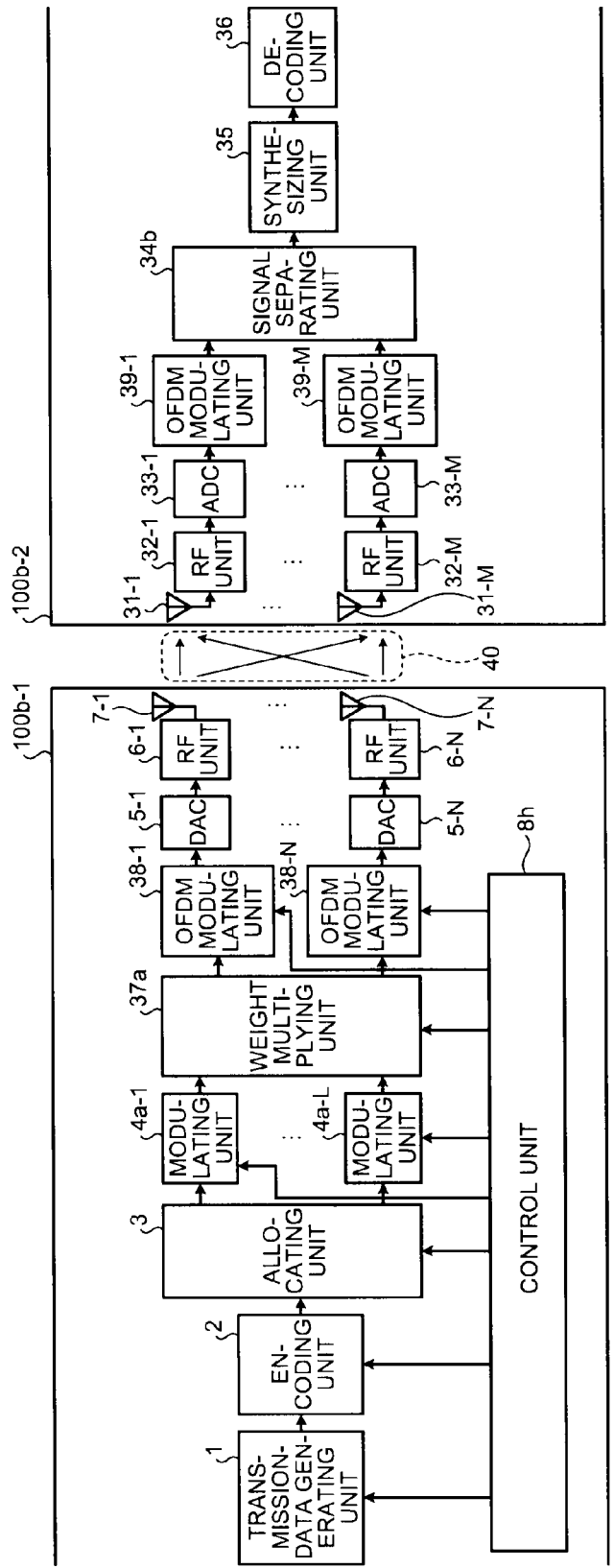
[FIG. 15]

FIG. 15 is a functional configuration example of a communication apparatus according to a ninth embodiment of the present invention. The communication apparatus according to the present embodiment includes, in addition to the functional configuration according to the eighth embodiment, OFDM modulating units 38-1 to 38-N and OFDM demodulating units 39-1 to 39-N, and includes modulating units 4a-1 to 4a-L and a weight multiplying unit 37a in place of the modulating units 4-1 to 4-L and the weight multiplying unit 37, respectively. Elements that are functionally similar to those of the first embodiment or the eighth embodiment are denoted by the same reference numerals as those of FIG. 1-1 and FIG. 14 and repeated descriptions are omitted. Identically-configured communication apparatuses 100b-1 and 100b-2 are depicted in FIG. 15, in which the transmitting unit of the communication apparatus 100b-1 and the receiving unit of the communication apparatus 100b-2 are shown. Although not shown, the communication apparatus 100b-1 includes the receiving unit as does the communication apparatus 100b-2, and the communication apparatus 100b-2 includes the transmitting unit as does the communication apparatus 100b-1.

The system control to be performed by the communication apparatus according to the present embodiment will be described. The difference in system control between the present embodiment and the first embodiment or the eighth embodiment will be described below. In the present embodiment, as in the case of the eighth embodiment, the allocating unit 3 of the communication apparatus 100b-1 allocates data to the transmission beams, and outputs the data to the modulating units 4a-1 to 4a-L. The modulating units 4a-1 to 4a-L output OFDM-modulated subcarrier (in OFDMA, subcarrier to which data is allocated) signals to the weight multiplying unit 37a.

The weight multiplying unit 37a of the communication apparatus 100b-1 performs multiplication of its input signals and a weight matrix, and outputs the result of multiplication to corresponding ones of the OFDM modulating units 38-1 to 38-N. When transmission beams are to be formed in OFDM or OFDMA, a value of the transmission weight matrix varies in a unit of each subcarrier or in a unit of a subcarrier group formed with a plurality of subcarriers. Accordingly, the weight multiplying unit 37a is capable of obtaining transmission weights that differ on a subcarrier-by-subcarrier basis or on a subcarrier-group-by-subcarrier-group basis. When the multiplication is performed by using a transmission weight matrix that is common to all the subcarriers, the all subcarriers can be considered as a single subcarrier group.

The OFDM modulating units 38-1 to 38-N perform OFDM modulation of each of input signals, and output the modulated signal to a corresponding one of the DACs 5-1 to 5-N. The output signals of the DACs 5-1 to 5-N are transmitted via corresponding ones of the RF units 6-1 to 6-N and the transmitting antennas 7-1 to 7-N.

In the receiving unit of the communication apparatus 100b-2, each of the receiving antennas 31-1 to 31-M receives a signal as in the case of the eighth embodiment. The received signals are output to the OFDM demodulating units 39-1 to 39-M via the RF units 32-1 to 32-M and the ADCs 33-1 to 33-M. The OFDM demodulating units 39-1 to 39-M perform OFDM demodulation of the received signals, and output the demodulated signals to a signal separating unit 34b. The signal separating unit 34b performs signal separation of output signals from the signal separating unit 34b on a subcarrier-by-subcarrier basis, and outputs the separated signals to the combining unit 35. The combining unit 35 performs the reverse of the allocation performed by the allocating unit 3 of the output signals from the signal separating unit 34b for data reconstruction.

In the present embodiment, neither of the interleaving and the rate matching is performed; however, as in the case of any one of the third to sixth embodiments, the present embodiment can additionally include the function of the interleaving or the rate matching.

As described above, according to the present embodiment, the OFDM modulating units 38-1 to 38-M are additionally provided and the weight multiplying unit performs the weight multiplication on a subcarrier-by-subcarrier basis. Accordingly, even when OFDM modulation is performed, high transmission quality is attained by interleaving of spatial stream, and spectral efficiency can be increased as compared with that attained by conventional interleaving of spatial streams. Weight multiplication makes it possible to further improve transmission quality as compared with that of the first to seventh embodiments.

Industrial Applicability

As set forth hereinabove, a transmission apparatus and a communication apparatus according to the present invention are suitable for MIMO transmitting-and-receiving system, and particularly effective for MIMO transmitting-and-receiving system that adopts interleaving of spatial streams.

The invention claimed is:

1. A transmission apparatus that divides transmission data according to spatial streams and transmits divided transmission data in parallel in a multiple-input multiple-output communication system, the transmission apparatus comprising:
a control unit configured to select a modulation scheme for each of the spatial streams and, after the modulation schemes are selected by the control unit, to determine a data allocation method for allocating the transmission data to a plurality of modulating units, each configured to modulate a respective one of the spatial streams, based on a ratio of the transmission rates corresponding to the selected modulation schemes;
an encoding unit configured to perform error correction encoding of the transmission data to generate a plurality of transmission data blocks, equal to each other in size, to be modulated simultaneously by the modulating units;
an allocating unit configured to allocate the transmission data to each of the spatial streams based on the data allocation method determined by the control unit, such that the allocating unit distributes the transmission data from each of the plurality of transmission data blocks over all of the plurality of modulating units based on the ratio of the transmission rates corresponding to the selected modulation schemes; and
the plurality of modulating units each configured to modulate the allocated transmission data for a respective one of the spatial streams, which is output from the allocating unit, by using the selected modulation scheme for each of the spatial streams,
wherein the allocating unit divides the transmission data in each transmission data block into a plurality of portions that is equal to the number of modulation units, the size of the portions with respect to each other corresponding to the ratio of the transmission rates, and allocates the portions from each of the transmission data blocks to the plurality of modulating units based on the ratio of the transmission rates, such that each modulating unit receives a number of portions of transmission data corresponding to the number of transmission blocks and which are equal to each other in size.

2. The transmission apparatus according to claim 1, wherein
the control unit is configured to further determine an encoding rate for each of the spatial streams, and
the allocating unit is configured to perform an error correction encoding of the allocated transmission data based on the encoding rate determined by the control unit for each of the spatial streams and to output the encoded data as the allocated transmission data for each of the spatial streams.

3. The transmission apparatus according to claim 1, wherein the allocating unit is configured to perform an interleaving for each of the spatial streams after allocating the transmission data until outputting the allocated data for each of the spatial streams.

4. The transmission apparatus according to claim 1, wherein the allocating unit is configured to further perform, before allocating the transmission data, either one of an interleaving by units of data corresponding to the transmission data and a collective interleaving by units of data corresponding to a plurality of transmission data.

5. The transmission apparatus according to claim 1, wherein the allocating unit is configured to further perform a rate matching for changing a transmission rate for each of the spatial streams after allocating the transmission data until outputting the allocated data for each of the spatial streams.

6. The transmission apparatus according to claim 1, wherein
the control unit is configured to further determine a rate matching scheme for changing a transmission rate, and
the allocating unit is configured to further perform, before allocating the transmission data, either one of a rate matching by units of data corresponding to the transmission data and a collective rate matching by units of data corresponding to a plurality of transmission data.

7. The transmission apparatus according to claim 1, further comprising an orthogonal-frequency-division-multiplexing modulating unit configured to perform an orthogonal-frequency-division-multiplexing modulation on an output of the modulating unit, wherein
the allocating unit is configured to allocate the transmission data to each of the spatial streams in units of any one of a subcarrier, a plurality of subcarriers, and all subcarriers.

8. The transmission apparatus according to claim 1, further comprising an orthogonal-frequency-division-multiple-access modulating unit configured to perform an orthogonal-frequency-division-multiple-access modulation on an output of the modulating unit, wherein
the allocating unit is configured to allocate the transmission data to each of the spatial streams in units of any one of a subcarrier, a plurality of subcarriers, and all subcarriers.

9. The transmission apparatus according to claim 1, wherein each of the spatial streams is made into a transmission beam generated for each transmitting antenna.

10. The transmission apparatus according to claim 1, wherein each of the spatial streams is made into a transmission beam generated for a plurality of transmitting antennas.

11. A reception apparatus that receives a signal transmitted from a transmission apparatus that divides transmission data according to spatial streams and transmits divided transmission data in parallel in a multiple-input multiple-output communication system, wherein
the transmission apparatus includes
a control unit configured to select a modulation scheme for each of the spatial streams and, after the modulation schemes are selected by the control unit, to determine a data allocation method for allocating the transmission data to a plurality of modulating units, each configured to modulate a respective one of the spatial streams, based on a ratio of the transmission rates corresponding to the selected modulation schemes,
an encoding unit configured to perform error correction encoding of the transmission data to generate a plurality of transmission data blocks, equal to each other in size, to be modulated simultaneously by the modulating units;
an allocating unit configured to allocate the transmission data to each of the spatial streams based on the data allocation method determined by the control unit, such that the allocating unit distributes the transmission data from each of the plurality of transmission data blocks over all of the plurality of modulating units based on the ratio of the transmission rates corresponding to the selected modulation schemes, and
the plurality of modulating units each configured to modulate the allocated transmission data for a respective one of the spatial streams, which is output from the allocating unit, by using the selected modulation scheme for each of the spatial streams,
wherein the allocating unit divides the transmission data in each transmission data block into a plurality of portions that is equal to the number of modulation units, the size of the portions with respect to each other corresponding to the ratio of the transmission rates, and allocates the portions from each of the transmission data blocks to the plurality of modulating units based on the ratio of the transmission rates, such that each modulating unit receives a number of portions of transmission data corresponding to the number of transmission blocks and which are equal to each other in size,
the reception apparatus comprising:
a combining unit configured to reconstruct data by performing a reverse operation to an operation performed by the allocating unit.

12. A method, implemented on a transmission apparatus that divides transmission data according to spatial streams and transmits divided transmission data in parallel in a multiple-input multiple-output communication system, the method comprising:
selecting, at a control unit, a modulation scheme for each of the spatial streams and, after the modulation schemes are selected, determining a data allocation method for allocating the transmission data to a plurality of modulating units, each configured to modulate a respective one of the spatial streams, based on a ratio of the transmission rates corresponding to the selected modulation schemes;
performing, at an encoding unit, error correction encoding of the transmission data to generate a plurality of transmission data blocks, equal to each other in size, to be modulated simultaneously by the modulating units;
allocating, at an allocating unit, the transmission data to each of the spatial streams based on the data allocation method determined by the control unit, such that the allocating unit distributes the transmission data from each of the plurality of transmission data blocks over all of the plurality of modulating units based on the ratio of the transmission rates corresponding to the selected modulation schemes; and
modulating, at the plurality of modulating units, the allocated transmission data for a respective one of the spatial streams, which is output from the allocating unit, by using the selected modulation scheme for each of the spatial streams,
wherein in the step of allocating, the allocating unit divides the transmission data in each transmission data block into a plurality of portions that is equal to the number of modulation units, the size of the portions with respect to each other corresponding to the ratio of the transmission rates, and allocates the portions from each of the transmission data blocks to the plurality of modulating units based on the ratio of the transmission rates, such that each modulating unit receives a number of portions of transmission data corresponding to the number of transmission blocks and which are equal to each other in size.

* * * * *